US010599134B2

(12) United States Patent
Benson et al.

(10) Patent No.: US 10,599,134 B2
(45) Date of Patent: Mar. 24, 2020

(54) PORTABLE FIELD MAINTENANCE TOOL CONFIGURED FOR MULTIPLE PROCESS CONTROL COMMUNICATION PROTOCOLS

(71) Applicant: FISHER-ROSEMOUNT SYSTEMS, INC., Round Rock, TX (US)

(72) Inventors: Roger Benson, Eden Prairie, MN (US); Anthony D. Ferguson, Minnetrista, MN (US); Todd M. Toepke, Eden Prairie, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 512 days.

(21) Appl. No.: 15/217,757

(22) Filed: Jul. 22, 2016

(65) Prior Publication Data
US 2018/0024538 A1 Jan. 25, 2018

(51) Int. Cl.
*G05B 19/418* (2006.01)
*G05B 19/042* (2006.01)
*G08B 21/18* (2006.01)

(52) U.S. Cl.
CPC ..... *G05B 19/4186* (2013.01); *G05B 19/0423* (2013.01); *G08B 21/185* (2013.01); *G05B 2219/25006* (2013.01); *G05B 2219/25008* (2013.01)

(58) Field of Classification Search
None
See application file for complete search history.

(56) References Cited

U.S. PATENT DOCUMENTS

| 5,999,740 A | 12/1999 | Rowley |
| 6,035,423 A | 3/2000 | Hodges et al. |
| 6,282,709 B1 | 8/2001 | Reha et al. |

(Continued)

FOREIGN PATENT DOCUMENTS

| CN | 101410800 A | 4/2009 |
| EP | 1 816 530 A1 | 8/2007 |

(Continued)

OTHER PUBLICATIONS

Beamex MC5 (discontinued) description, Retrieved from the internet at http://www.beamex.com/beamex_products/MC5-%28discounted%29/na15ghgl/355ca6b7-66ff-469f-9bd4-1f26c0870452#Features> (Jul. 8, 2016).

(Continued)

*Primary Examiner* — Steven Lim
*Assistant Examiner* — Muhammad Adnan
(74) *Attorney, Agent, or Firm* — Marshall, Gerstein & Borun LLP

(57) ABSTRACT

A portable field maintenance tool may perform one or more tasks, such as communicating with a field device, powering a field device, diagnosing a field device, or diagnosing a communication link in a plant environment to which a field device is connected. The portable field maintenance tool may interact with field devices configured according to a number of different communication protocols, such as the HART protocol and the Fieldbus protocol. The portable field maintenance tool may be energy limited and fault tolerant, and may operate in compliance with Intrinsic Safety standards, enabling use of the portable field maintenance tool in hazardous areas.

30 Claims, 18 Drawing Sheets

(56) References Cited

U.S. PATENT DOCUMENTS

| | | | |
|---|---|---|---|
| 6,411,923 B1* | 6/2002 | Stewart | G05B 15/02 700/11 |
| 6,788,980 B1* | 9/2004 | Johnson | G05B 19/042 700/1 |
| 6,889,166 B2 | 5/2005 | Zielinski et al. | |
| 6,959,356 B2* | 10/2005 | Packwood | H04L 69/18 700/1 |
| 7,010,294 B1 | 3/2006 | Pyotsia et al. | |
| 7,016,741 B2 | 3/2006 | Arntson | |
| 7,027,952 B2* | 4/2006 | DelaCruz | G05B 19/4183 455/557 |
| 7,177,122 B2 | 2/2007 | Hou et al. | |
| 7,181,550 B2* | 2/2007 | Shepard | G05B 19/042 710/104 |
| 7,227,656 B1 | 6/2007 | Kato | |
| 7,289,994 B2 | 10/2007 | Nixon et al. | |
| 7,328,078 B2 | 2/2008 | Sanford et al. | |
| 7,421,531 B2 | 9/2008 | Rotvold et al. | |
| 7,454,553 B2* | 11/2008 | Nelson | H04L 12/10 710/105 |
| 7,539,978 B1 | 5/2009 | Haddox et al. | |
| 7,620,948 B1 | 11/2009 | Rowe et al. | |
| 7,675,932 B2 | 3/2010 | Schumacher | |
| 7,840,296 B2 | 11/2010 | Sanford et al. | |
| 7,975,266 B2 | 7/2011 | Schneider et al. | |
| 8,055,371 B2 | 11/2011 | Sanford et al. | |
| 8,112,565 B2* | 2/2012 | Russell, III | G06F 13/387 710/62 |
| 8,127,241 B2 | 2/2012 | Blevins et al. | |
| 8,204,717 B2 | 6/2012 | McLaughlin et al. | |
| 8,286,154 B2 | 10/2012 | Kaakani et al. | |
| 8,296,494 B1* | 10/2012 | Sheffield | G06F 13/4282 370/489 |
| 8,344,542 B2* | 1/2013 | Micallef | G01D 21/00 307/26 |
| 8,390,150 B2* | 3/2013 | Vande Vusse | G05B 19/0423 307/112 |
| 8,458,659 B2 | 6/2013 | Resnick et al. | |
| 8,626,916 B2 | 1/2014 | Armstrong et al. | |
| 8,766,794 B2 | 7/2014 | Ferguson et al. | |
| 9,003,387 B2 | 4/2015 | Van Camp et al. | |
| 9,244,455 B2 | 1/2016 | Peterson et al. | |
| 9,288,289 B2* | 3/2016 | Nakamura | H04L 69/18 |
| 9,495,313 B2* | 11/2016 | Burr | G05B 19/042 |
| 9,634,858 B2* | 4/2017 | Reller | G05B 19/042 |
| 9,702,732 B2* | 7/2017 | Repyevsky | G05B 19/048 |
| 2002/0167904 A1* | 11/2002 | Borgeson | G05B 19/4183 370/241 |
| 2003/0023795 A1* | 1/2003 | Packwood | H04L 69/18 710/105 |
| 2003/0093519 A1* | 5/2003 | Jackson | G05B 19/0423 709/224 |
| 2004/0039458 A1* | 2/2004 | Mathiowetz | G05B 19/4183 700/17 |
| 2004/0181787 A1 | 9/2004 | Wickham et al. | |
| 2004/0230401 A1* | 11/2004 | Duren | G05B 19/409 702/184 |
| 2005/0132349 A1* | 6/2005 | Roberts | G06F 8/65 717/168 |
| 2005/0228798 A1 | 10/2005 | Shepard et al. | |
| 2006/0282580 A1* | 12/2006 | Russell, III | G06F 13/387 710/62 |
| 2007/0004168 A1* | 1/2007 | Zips | G05B 15/02 438/431 |
| 2007/0022403 A1 | 1/2007 | Brandt et al. | |
| 2007/0118699 A1 | 5/2007 | Synard et al. | |
| 2007/0169079 A1 | 7/2007 | Keller et al. | |
| 2008/0040449 A1 | 2/2008 | Grant et al. | |
| 2008/0049984 A1 | 2/2008 | Poo et al. | |
| 2008/0075012 A1* | 3/2008 | Zielinski | H04L 12/40032 370/241 |
| 2008/0114911 A1* | 5/2008 | Schumacher | G05B 19/0423 710/72 |
| 2008/0126005 A1* | 5/2008 | Guenter | G01F 23/0061 702/140 |
| 2008/0156090 A1* | 7/2008 | Wehrs | G01M 3/16 73/290 R |
| 2008/0268784 A1* | 10/2008 | Kantzes | G05B 19/0423 455/66.1 |
| 2009/0094462 A1 | 4/2009 | Madduri | |
| 2009/0133012 A1 | 5/2009 | Shih | |
| 2009/0138870 A1 | 5/2009 | Shahindoust et al. | |
| 2009/0320125 A1 | 12/2009 | Pleasant, Jr. et al. | |
| 2010/0013325 A1* | 1/2010 | Vande Vusse | G05B 19/0423 307/130 |
| 2010/0077111 A1* | 3/2010 | Holmes | H04L 12/40013 710/33 |
| 2010/0146497 A1 | 6/2010 | Kogan et al. | |
| 2011/0087461 A1 | 4/2011 | Hollander et al. | |
| 2011/0224808 A1 | 9/2011 | Lucas et al. | |
| 2011/0286542 A1* | 11/2011 | Shelburne | H04L 27/12 375/272 |
| 2012/0038760 A1 | 2/2012 | Kantzes et al. | |
| 2013/0024495 A1* | 1/2013 | Armstrong | G05B 19/0426 709/203 |
| 2013/0070745 A1 | 3/2013 | Nixon et al. | |
| 2013/0214898 A1 | 8/2013 | Pineau et al. | |
| 2014/0018955 A1 | 1/2014 | Asakawa et al. | |
| 2014/0019768 A1 | 1/2014 | Pineau et al. | |
| 2014/0047107 A1 | 2/2014 | Maturana et al. | |
| 2014/0056173 A1* | 2/2014 | Nakamura | H04L 69/18 370/254 |
| 2014/0181955 A1 | 6/2014 | Rosati | |
| 2014/0257756 A1* | 9/2014 | van der Linde | G05B 19/0428 702/189 |
| 2014/0273847 A1 | 9/2014 | Nixon et al. | |
| 2015/0024710 A1 | 1/2015 | Becker et al. | |
| 2015/0098158 A1 | 4/2015 | Kemp et al. | |
| 2015/0134289 A1* | 5/2015 | Mrvaljevic | G01D 18/008 702/85 |
| 2015/0281227 A1 | 10/2015 | Fox Ivey et al. | |
| 2016/0026813 A1 | 1/2016 | Neitzel et al. | |
| 2016/0132046 A1 | 5/2016 | Beoughter et al. | |
| 2016/0154394 A1 | 6/2016 | Peterson et al. | |
| 2016/0299175 A1 | 10/2016 | Dewey et al. | |
| 2016/0305800 A1* | 10/2016 | Hocker | G05B 19/042 |
| 2016/0352534 A1* | 12/2016 | Ringkamp | H04L 12/40006 |
| 2017/0078265 A1 | 3/2017 | Sundaresh et al. | |
| 2017/0257378 A1 | 9/2017 | Sprenger et al. | |

FOREIGN PATENT DOCUMENTS

| | | |
|---|---|---|
| EP | 1 906 623 A1 | 4/2008 |
| EP | 2 026 223 A2 | 2/2009 |
| EP | 2 067 088 A2 | 6/2009 |
| EP | 2 782 073 A1 | 9/2014 |
| GB | 2 465 495 A | 5/2010 |
| GB | 2 535 839 A | 8/2016 |
| GB | 2 539 311 A | 12/2016 |
| GB | 2 548 007 A | 9/2017 |
| JP | 2002-007129 A | 1/2002 |
| JP | 2004-234056 A | 8/2004 |
| JP | 2009-187420 A | 8/2009 |
| WO | WO-2008/045258 A2 | 4/2008 |
| WO | WO-2013/184117 A1 | 12/2013 |
| WO | WO-2016/020165 A1 | 2/2016 |
| WO | WO-2017/085923 A1 | 5/2017 |

OTHER PUBLICATIONS

Fieldbus Foundation, "Foundation Fieldbus Application Guide; 31,25 kbit/s Intrinsically Safe Systems." Retrieved from the internet at <http://www.fieldbus.org/images/stories/enduserresources/technicalreferences/documents/instrinsciallysafesystems.pdf> (May 26, 2016).

Omega, "Understanding What's Meant by Intrinsically Safe." Retrieved from the internet at <http://www.omega.com/technical-learning/understanding-what-is-meant-by-intrinsically-safe.html> (May 26, 2016).

(56) References Cited

OTHER PUBLICATIONS

Pepperl+Fuchs, "Fieldbus Engineer's Guide." Retrieved from the internet at <http://files.pepperl-fuchs.com/selector_files/navi/productInfo/doct/tdoct3032_eng.pdf> (Jun. 2, 2016).
Emerson Process Management, "475 Field Communicator." Retrieved from the internet at <http://www2.emersonprocess.com/siteadmincenter/PM%20Asset%20Optimization%20Documents/ProductReferenceAndGuides/475_ru_usermanual.pdf> (May 26, 2016).
Omega, "Digital Signal Transmission." Retrieved from the internet at <https://www.omega.com/literature/transactions/volume2/digitalsignal4.html> (May 26, 2016).
Wikipedia, "Intrinsic Safety." Retrieved from the internet at <https://en.wikipedia.org/wiki/Intrinsic_safety> (May 24, 2016).
Costall, "Essential Concepts of Intrinsic Safety," Spark Institute. Retrieved from the internet at <http://www.sparkinstitute.ca/wp/WP00_-_Essential_Concepts_of_Intrinsic_Safety.pdf> (May 24, 2016).
U.S. Appl. No. 15/216,810, filed Jul. 22, 2016.
Search Report for Application No. GB1709952.4, dated Nov. 29, 2017.
Search Report for Application No. GB1710027.2, dated Oct. 19, 2017.
Search Report for Application No. GB1710029.8, dated Dec. 21, 2017.
Search Report for Application No. GB1710117.1, dated Oct. 23, 2017.
Search Report for Application No. GB1710119.7, dated Oct. 24, 2017.
Search Report for Application No. GB1710124.7, dated Oct. 20, 2017.
Search Report for Application No. GB1710125.4, dated Oct. 12, 2017.
Search Report for Application No. GB1710210.4, dated Oct. 26, 2017.
Search Report for Application No. GB1710211.2, dated Nov. 30, 2017.
Search Report for Application No. GB1710266.6, dated Dec. 19, 2017.
Search Report for Application No. GB1711106.3, dated Nov. 21, 2017.
Beamex MC5 (discontinued) description, Retrieved from the internet at http://www.beamex.com/beamex_products/MC5-%28discounted%29/na15ghgl/355ca6b7-66ff-469f-9bd4-1f2610870452#Features> (Jul. 8, 2016).
Beamex MC6 Advanced Field Calibrator and Communicator, Product Brochure (2016).
Examination Report Under Section 18(3) in Application No. GB1015879.8, dated Mar. 13, 2014.
Examination Report Under Section 18(3) in Application No. GB1015879.8, dated Mar. 20, 2015.
Examination Report under Section 18(3) dated Oct. 2, 2014 in Application No. GB1015879.8, 3 pgs.
First Office Action for corresponding Chinese Patent Application No. 201010572412.4, dated Jun. 5, 2014, 8 pgs.
Fluke 709 Precision Loop Calibrator, User Manual, © 2013 Fluke Corporation.
Fluke 709/709H Precision Loop Calibrator, Quick Reference Guide (2013).
GE Measurement & Control Systems, Druck DPI 620-IS advanced modular calibrator user manual, © Druck Limited 2010.
Office Action for corresponding Japanese Patent Application No. 2010-215391, dated Aug. 19, 2014, 4 pgs.
Search Report for Application No. GB1015879.8, dated Jan. 13, 2011.
U.S. Appl. No. 14/682,714, filed Apr. 9, 2015.
U.S. Appl. No. 15/214,949, filed Jul. 20, 2016.
U.S. Appl. No. 15/214,975, filed Jul. 20, 2016.
User Manual for Beamex® MC6 Advanced Field Calibrator and Communicator (2012-2015).
Wiring and Installation 31.25 kbit/s, Voltage Mode, Wire Medium, Application Guide, FoundationTM Fieldbus, © 1996 Fieldbus Foundation.

* cited by examiner

PORTABLE FIELD MAINTENANCE TOOL CONFIGURED FOR MULTIPLE PROCESS CONTROL COMMUNICATION PROTOCOLS

TECHNICAL FIELD

The present disclosure generally relates to a portable field maintenance tool, and in particular, to a portable field maintenance tool capable use in a wide variety of environments and situations.

BACKGROUND

Process control systems, like those used in chemical and petroleum processes, typically include one or more process controllers communicatively coupled to at least one host or operator workstation and to one or more field devices via analog, digital, or combined analog/digital communication links.

A process controller (sometimes referred to as a "controller"), which is typically located within the plant environment, receives signals (sometimes referred to as "control inputs") indicative of process measurements and uses the information carried by these signals to implement control routines that cause the controller to generate control signals (sometimes referred to as "control outputs") based on the control inputs and the internal logic of the control routines. The controllers send the generated control signals over buses or other communication links to control operation of field devices. In some instances, the controllers may coordinate with control routines implemented by smart field devices, such as Highway Addressable Remote Transmitter (HART®), Wireless HART®, and FOUNDATION® Fieldbus (sometimes just called "Fieldbus") field devices.

The field devices, which may be, for example, valves, valve positioners, switches, and transmitters (e.g., including temperature, pressure, level, or flow rate sensors), are located within the plant environment and generally perform physical or process control functions. For example, a valve may open or close in response to a control output received from a controller, or may transmit to a controller a measurement of a process parameter so that the controller can utilize the measurement as a control input. Smart field devices, such as field devices conforming to the Fieldbus protocol, may also perform control calculations, alarming functions, and other control functions commonly implemented within a process controller. Field devices may be configured to communicate with controllers and/or other field devices according to various communication protocols. For example, a plant may include traditional analog 4-20 mA field devices, HART® field devices, or Fieldbus field devices.

Traditional analog 4-20 mA field devices communicate with a controller via a two-wire communication link (sometimes called a "loop" or "current loop") configured to carry an analog 4-20 mA DC signal indicative of a measurement or control command. For example, a level transmitter may sense a tank level and transmit via the loop a current signal corresponding to that measurement (e.g., a 4 mA signal for 0% full, a 12 mA signal for 50% full, and a 20 mA signal for 100% full). The controller receives the current signal, determines the tank level measurement based on the current signal, and takes some action based on the tank level measurement (e.g., opening or closing an inlet valve). Analog 4-20 mA field devices typically come in two varieties: four-wire field devices and two-wire field devices. A four-wire field device typically relies on a first set of wires (i.e., the loop) for communication, and a second set of wires for power. A two-wire field device relies on the loop for both communication and power. These two-wire field devices may be called "loop powered" field devices.

Process plants often implement traditional 4-20 mA systems due to the simplicity and effectiveness of the design. Unfortunately, traditional 4-20 mA current loops only transmit one process signal at a time. Thus, a set-up including a control valve and a flow transmitter on a pipe carrying material may require three separate current loops: one for carrying a 4-20 mA signal indicative of a control command for the valve (e.g., to move the valve to 60% open); a second for carrying, to the controller, a 4-20 mA signal indicative of the valve's actual position (e.g., so the controller knows the degree to which the valve has responded to control commands); and a third for carrying, to the controller, a 4-20 mA signal indicative of a measured flow (e.g., so the controller knows how a change in valve position has affected the flow). As a result, a traditional 4-20 mA set-up in a plant having a large number of field devices may require extensive wiring, which can be costly and can lead to complexity when setting up and maintaining the communication system.

More recently, the process control industry has moved to implement digital communications within the process control environment. For example, the HART® protocol uses the loop DC magnitude to send and receive analog signals, but also superimposes an AC digital carrier signal on the DC signal to enable two-way field communication with smart field instruments. As another example, the Fieldbus protocol provides all-digital communications on a two-wire bus (sometimes called a "trunk," "segment," or "Fieldbus segment"). This two-wire Fieldbus segment can be coupled to multiple field devices to provide power to the multiple field devices (via a DC voltage available on the segment) and to enable communication by the field devices (via an AC digital communication signal superimposed on the DC power supply voltage).

These digital communication protocols generally enable more field devices to be connected to a particular communication link, support more and faster communication between the field devices and the controller, and/or allow field devices to send more and different types of information (such as information pertaining to the status and configuration of the field device itself) to the process controller. Furthermore, these standard digital protocols enable field devices made by different manufacturers to be used together within the same process control network.

Regardless of the communication protocol utilized, field devices may require on-site setup, configuration, testing, and maintenance. For example, before a field device can be installed at a particular location at a process control plant, the field device may need to be programmed and may then need to be tested before and after the field device is installed. Field devices that are already installed may also need to be regularly checked for maintenance reasons or, for example, when a fault is detected and the field device needs to be diagnosed for service or repair. Generally speaking, configuration and testing of field devices are performed on location using a handheld maintenance tool, such as a portable testing device ("PTD"). Because many field devices are installed in remote, hard-to-reach locations, it is more convenient for a user to test the installed devices in such remote locations using a PTD rather than using a full configuration and testing device, which can be heavy, bulky, and non-portable, generally requiring the installed field device to be transported to the site of the diagnostic device.

When a user, such as a service technician, performs maintenance testing and/or communications with a field device, the PTD is typically communicatively connected to a communication link (e.g., a current loop or Fieldbus segment) or directly to a field device (e.g., via communication terminals of the field device). The PTD initially attempts to communicate with the field device, such as by sending and/or receiving digital communication signals along the loop or segment. If the current loop or segment is in proper operating condition, the communications signals may be sent and/or received without problem. However, if the loop, segment, or field device contains an electrical fault, such as a short or a break, communications may be impeded, and it may be necessary to diagnose the loop, segment, and/or field device to identify the fault.

When such a fault is identified, a technician might need to use a variety of other tools to test the field device and/or communication link. As an example, the technician may need to carry a multimeter to diagnose the actual signals transmitted or received by the field device. The multimeter is necessary because traditional PTDs are incapable of accurately analyzing the electrical characteristics of signals sent or received by a field device. As another example, the technician may need to use a portable power supply to power an isolated field device. The technician may need to power an isolated field device, for example, when the field device loses power due to a plant-wide power outage or due to an issue with a local power supply. As another example, the technician may simply need to take a field device offline for troubleshooting in order to avoid negatively effecting other field devices and the rest of the process control system. The technician may also need to carry a multimeter to measure the current available on a segment or loop, etc. Each of these tools can take up a fair amount of space, and may be inconvenient for a technician to carry in the field. To address this problem with carrying multiple tools, manufacturers have developed PTDs that include a power supply for providing power to a HART loop. Unfortunately, these powered PTDs are typically incapable of providing power to Fieldbus field devices. Further, typical portable power supplies and powered PTDs often fail to comply with Intrinsic Safety (IS) standards, and thus cannot be safely used in hazardous areas (e.g., an environments or atmospheres that are potentially explosive due to explosive gas or dust).

If a field device is located in a hazardous area, the technician may need to verify that each of his or her tools operates in an intrinsically safe manner. When in a hazardous area, a technician's tools may need to comply with IS standards to ensure safe operation. Generally speaking, IS standards require that plant personnel analyze all equipment attached to a loop or segment (including any PTDs or other tools that will be attached to the loop or segment) to verify that all attached equipment will operate in a safe manner in a hazardous environment. More particularly, IS standards impose restrictions on electrical equipment and wiring in hazardous environments to ensure that the electrical equipment and wiring does not ignite an explosion. To comply with IS standards, electrical equipment generally needs to be designed with two core concepts in mind: energy limitation and fault tolerance.

The first IS concept dictates that an IS device be designed such that the total amount of energy available in the device be below a threshold sufficient to ignite an explosive atmosphere. The energy can be electrical (e.g., in the form of a spark) or thermal (e.g., in the form of a hot surface). While IS standards can be complex, they generally require that any voltage within a circuit be less than 29 V; that any current within a circuit be under 300 mA; and that the power associated with any circuit or circuit component be under 1.3 W. A circuit having electrical characteristics exceeding these thresholds may pose an explosion risk due to arcing or heat.

The second IS concept dictates that that an IS device be designed in a fault tolerant manner, such that it maintains safe energy levels even after experiencing multiple failures. In short, IS standards reflect a philosophy that circuit faults are inevitable and that energy levels of the circuit must be limited to safe levels when these circuit faults occur.

Generally speaking, portable power supplies and powered PTDs are not IS compliant and thus cannot be used in hazardous areas because: (i) portable power supplies and powered PTDs are typically designed such that one or more components may exceed energy levels sufficient to risk igniting an explosive atmosphere, and/or (ii) the portable power supplies and powered PTDs are vulnerable to component failures that would result in the portable power supplies or powered PTDs exceeding energy levels sufficient to risk igniting the explosive atmosphere.

For example, a typical portable power supply may generate a voltage across its terminals sufficient to risk an explosion in a hazardous environment (e.g., above 29 V). Even when designed to supply a voltage of under 29 V, a typical portable power supply does not include fail-safe mechanisms guaranteed to prevent the supplied voltage or current from spiking. Consequently, when in a hazardous environment, technicians needing to provide power to a field device generally must uninstall the field device and transport the field device to a safe area where it can be powered and tested.

SUMMARY

This disclosure describes a portable field maintenance tool configured for use in industrial process control systems, environments, and/or plants, which are interchangeably referred to herein as "automation," "industrial control," "process control," or "process" systems, environments, and/or plants. Typically, such systems and plants provide control, in a distributed manner, of one or more processes that operate to manufacture, refine, transform, generate, or produce physical materials or products.

The described portable field maintenance tool may power, communicate with, and/or diagnose field devices and/or communication links connected to field devices. The portable field maintenance tool may be configured for use with field devices configured according to multiple communication protocols, such as the Fieldbus protocol and the HART protocol. Accordingly, rather than being forced to carry multiple tools for servicing different types of field devices, a user need only carry the portable field maintenance tool. In some instances, the portable field maintenance tool may be energy limited and fault tolerant sufficient to comply with IS standards. Accordingly, unlike many prior art portable power supplies and PTDs, the portable field maintenance tool can safely be used in hazardous areas.

BRIEF DESCRIPTION OF THE DRAWINGS

Each of the figures described below depicts one or more aspects of the disclosed system(s) and/or method(s), according to an embodiment. Wherever possible, the Detailed Description refers to the reference numerals included in the following figures.

DETAILED DESCRIPTION

Figure 1A:
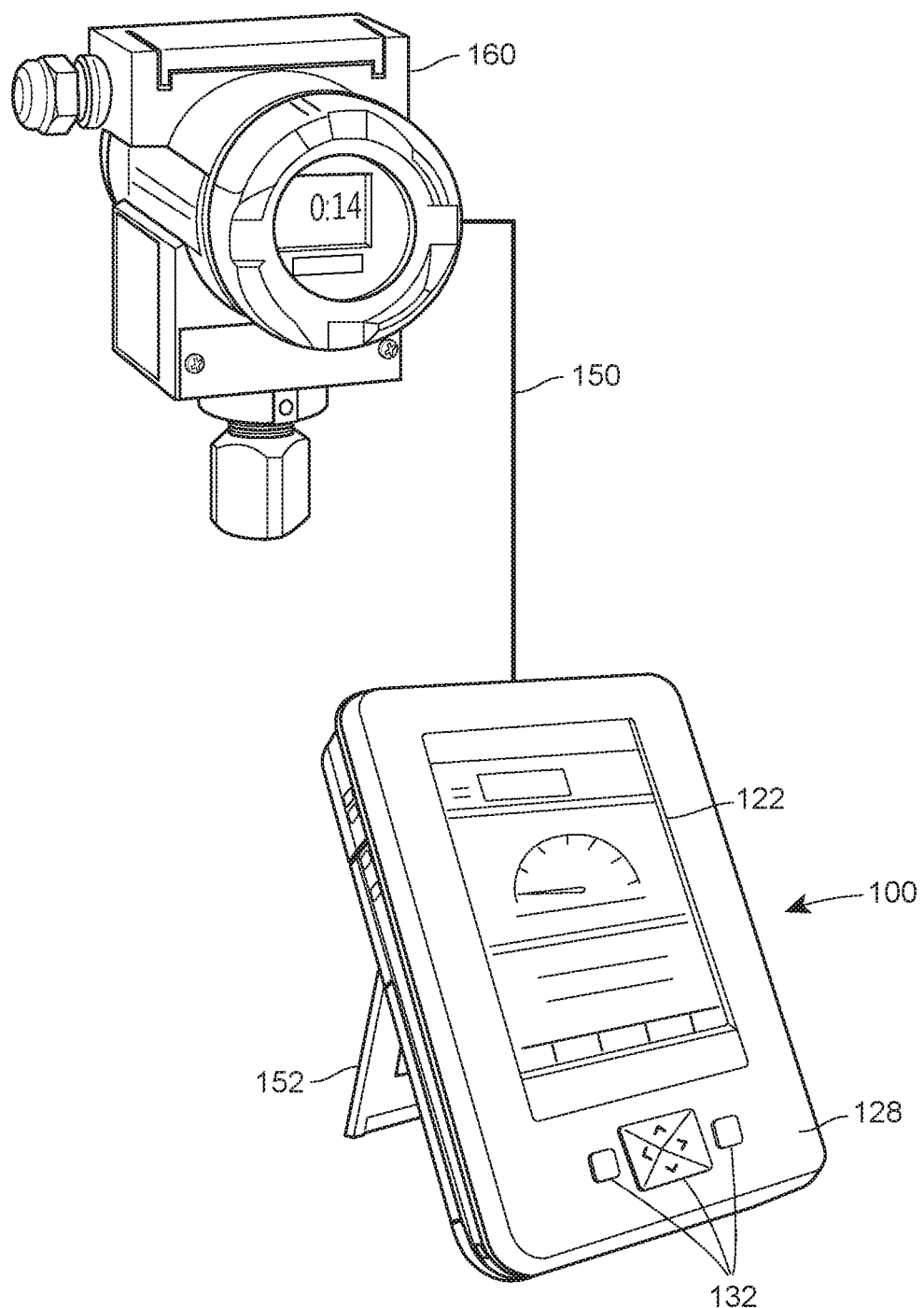
FIG. 1A depicts an example portable field maintenance tool connected to a field device.

The present disclosure describes a portable field maintenance tool and various techniques for implementing the portable field maintenance tool. FIG. 1A depicts an example portable field maintenance tool 100 ("tool 100") that may be connected to a field device 160 via a communication link 150. Advantageously, the tool 100 is capable of not only communicating with the field device 160, but of also powering the field device 160. The tool 100 may utilize a single composite signal, transmitted via the link 150, for both powering and communicating with the field device 160. In some cases, the tool 100 can diagnose problems with the field device 160 or with a communication link in the plant environment to which the field device 160 is connected (e.g., a HART loop or Fieldbus segment; not shown). In some instances, the tool 100 may communicate with or diagnose field devices configured according to different protocols. For example, the tool 100 may be capable of communicating with, powering, and diagnosing traditional 4-20 field devices, HART field devices, and Fieldbus field devices. Unlike many prior art PTDs that force a user to utilize multiple devices and/or to connect multiple cables and wires to various different terminal sets if he or she wants to communicate with a field device, power the field device, and perform diagnostics on signals sent or received by the field device, the tool 100 may utilize a single terminal set for communications, power, and diagnostics, simplifying configuration and use of the tool 100 for users.

Moreover, the tool 100 may be energy limited and fault tolerant sufficient to comply with IS standards. For example, the tool 100 may be designed so that all components of the tool 100 and so that all signals (e.g., including power and/or communication signals) transmitted and/or received by the tool 100 are energy limited to ranges compliant with IS standards. Further, the tool 100 may "self-monitor" components of the tool 100 and/or signals transmitted or received by the tool 100 to ensure that the components and/or signals remain IS compliant. To illustrate, the tool 100 may disable one or more components (or disable the tool 100 entirely) when a component or signal approaches or exceeds a threshold associated with IS standards. Accordingly, when the tool 100 is IS compliant, a user can connect the tool 100 to the field device 160 or to a link (e.g., a HART loop or Fieldbus segment) to which the field device 160 is connected with confidence that he or she will not violate IS standards and with confidence that he or she will not ignite an explosive atmosphere. In short, unlike many traditional portable power supplies and PTDs, the tool 100 may safely be used in hazardous areas.

The communication link 150 may be a two-wire communication link capable of carrying a communication signal and/or a power signal, each of which may be part of a composite signal. As used herein, the term "signal" may refer to a communication signal, a power signal, or a composite signal conveying both power and information. Generally speaking, the term "communication signal" refers to any signal conveying information (such as a control signal that commands an actuator to actuate), and may be analog or digital and AC or DC. The term "power signal" refers to any electrical energy transmitted for the purpose of supplying power, and may be AC or DC. The tool 100 may have a terminal set for connecting to the link 150 and field device 160, and in some cases may have multiple terminal sets for connecting to field devices configured to various different protocols (e.g., a terminal set for HART field devices and a terminal set for Fieldbus field devices).

To power the field device 160, the tool 100 may include a power supply configured to supply a voltage across terminals of the tool 100 to which the communication link 150 is connected.

The tool 100 may be configured to communicate with the field device 160 via a composite signal (transmitted via the link 150) including a communication signal (to facilitate communication between the tool 100 and the field device 160) and a power signal (to provide power to the field device 160). The communication signal may be a digital signal, an analog signal, or a composite analog and digital signal. Said another way, the tool 100 may transmit and/or receive a first composite signal including a power signal and a second composite signal that includes an analog and digital signal.

For example, the tool 100 may include a first terminal set for transmitting and/or receiving a first composite signal (e.g., a HART signal) including: (i) a DC power signal (e.g., 4 mA), and (ii) a second composite signal for communications (e.g., an AC digital communication signal superimposed on a 0-16 mA DC communication signal) superimposed on the 4 mA power signal. In such an example, the power signal generally remains constant at 4 mA and represents a live zero, resulting in the first composite signal having a current magnitude range of 4-20 mA. The tool 100 may additionally or alternatively have a second terminal set for transmitting and/or receiving a composite signal according to other protocols, such as the Fieldbus protocol. For example, the tool 100 may transmit and/or receive a composite signal including: (i) a DC power signal (e.g., 10-25 mA), and (ii) an AC digital communication signal (e.g., modulated at 15-20 mA peak-to-peak) superimposed on the DC power signal. In some cases, the tool 100 includes one or more terminal sets for transmitting analog and/or digital communication signals without providing power (e.g., for situations where the field device 160 is already powered).

As noted, the tool 100 may operate in compliance with IS standards. That is, the tool 100 may safely be used in hazardous areas because the components of the tool 100 may be energy limited and fault tolerant in accordance with IS standards. For example, the components of the tool 100 may be (i) current limited to a current limit (e.g., 250 mA, 300 mA, 350 mA, etc.) (ii) voltage limited to voltage limit (e.g., 25 V, 29 V, 35V, etc.) and (iii) power limited to a power limit (e.g., 1 W, 1.3 W, 1.5 W, etc.). The tool 100 may have one or more built-in redundancies (e.g., automatic shutdown, redundant components, etc.) to ensure that component failure does not result in these energy limitations being exceeded.

The tool 100 may include any one or more of: a display 122, a housing 128, input keys 132, and a folding stand 152.

The housing 128 may be shaped and sized as a handheld unit. The housing 128 may have a generally rectangular cubic shape, or any other desirable shape or size (e.g., 5 inches, 7 inches, or 11 inches measured diagonally).

The display 122 and input keys 132 may be disposed on a front face of the housing. The display 122 may be a touchscreen, such as a capacitive touchscreen that detects touch input via capacitive sensing, or a resistive touchscreen that detects touch input via applied pressure. The input keys 32 may be physical keys, such as push buttons or multi-directional buttons. In some cases, the tool 100 does not include the input keys 32.

The folding stand 152 may pivot between a flat position against the back of the housing 128 and an outwardly pivoted position from the back of the housing 128. In the flat position, a user can carry the tool 100 and use the tool 100 in a similar manner that one would use a tablet. In the outwardly pivoted position, the folding stand 152 can be used to prop the maintenance tool 100 in an upright position. In some instances, the tool 100 does not include the folding stand 152.

Figure 1B:
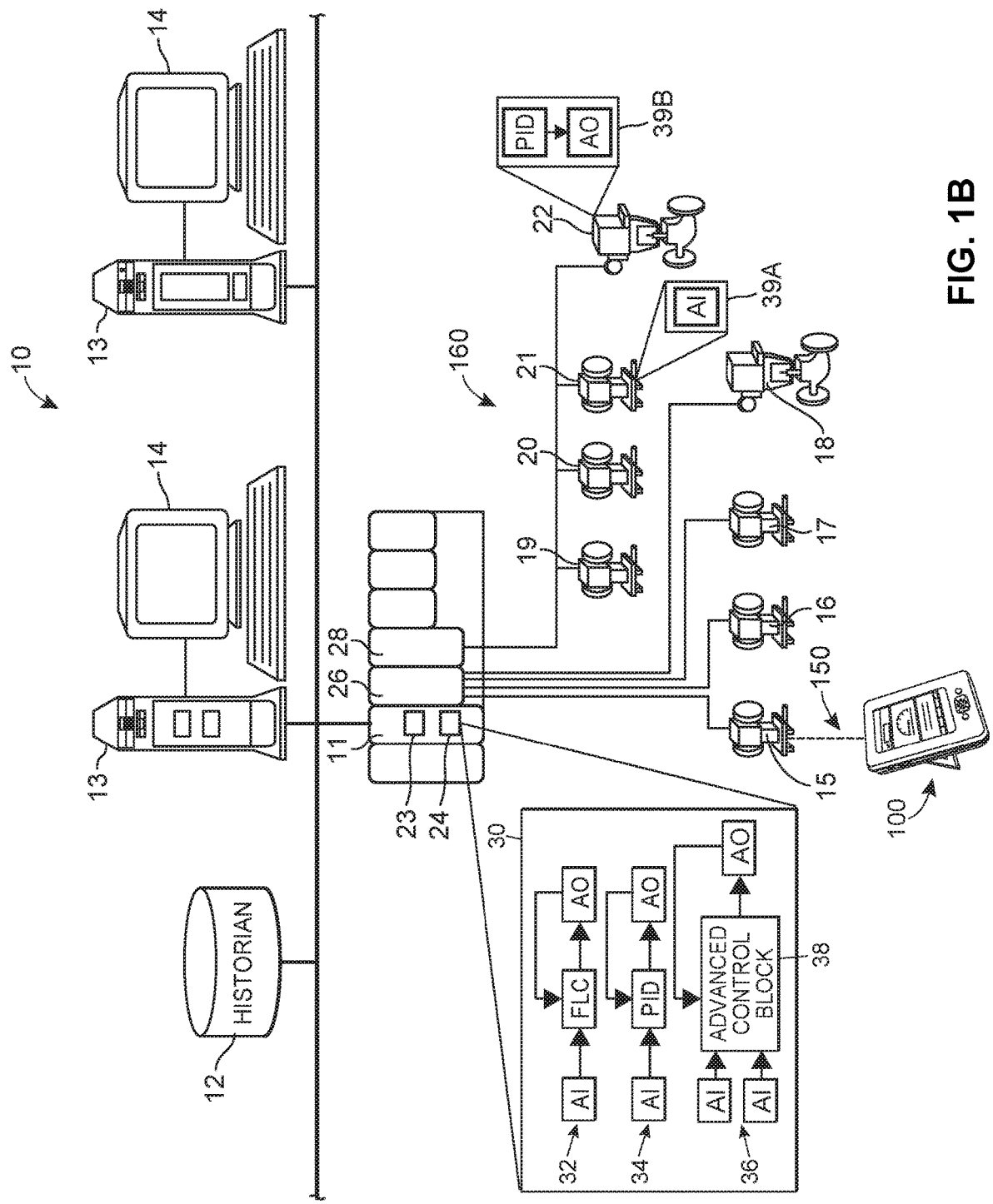
FIG. 1B is a block diagram of an example process control system where the portable field maintenance tool shown in FIG. 1A may be utilized to communicate with, diagnose, or power one or more field devices.

FIG. 1B is a block diagram of an example process control system 10 where the tool 100 may be utilized to communicate with, diagnose, or power one or more field devices. The process control system 10 includes a process controller 11 connected to a data historian 12 and to one or more host workstations or computers 13 (which may be any type of personal computers, workstations, etc.), each having a display screen 14. The process control system 10 may include a plurality of field devices 160, including field devices 15-22.

The controller 11 may be connected to field devices 15-22 via input/output ("I/O") cards 26 and 28. The data historian 12 may be any desired type of data collection unit having any desired type of memory and any desired or known software, hardware, or firmware for storing data. The controller 11 is, in FIG. 1B, communicatively connected to the field devices 15-22.

Generally, the field devices 15-22 may be any types of devices, such as sensors, valves, transmitters, positioners, etc., while the I/O cards 26 and 28 may be any types of I/O devices conforming to any desired communication or controller protocol. For example, the field devices 15-22 and/or I/O cards 26 and 28 may be configured according to the HART protocol or to the Fieldbus protocol. The controller 11 includes a processor 23 that implements or oversees one or more process control routines 30 (or any module, block, or sub-routine thereof) stored in a memory 24. Generally speaking, the controller 11 communicates with the devices 15-22, the host computers 13, and the data historian 12 to control a process in any desired manner. Moreover, the controller 11 implements a control strategy or scheme using one or more function blocks 32-38, wherein each function block is an object or other part (e.g., a subroutine) of an overall control routine 30. The function blocks 32-38 may be stored in and executed by the controller 11 or other devices, such as smart field devices.

The tool 100 may be communicatively connected via the link 150 to a communication link (e.g., a HART loop or Fieldbus Segment) connecting one of the field devices 15-22 to the I/O cards 26 and 28. Alternatively, the tool 100 may be communicatively connected directly to one of the field devices 15-22 (e.g., via communication terminals present on the field devices 15-22). If desired, the tool 100 may provide power to the field devices 15-22 to which the tool 100 is connected, or to a bus (e.g., a Fieldbus segment) to which the field devices 15-22 are connected. The tool 100 may enable a user to communicate with and/or diagnose any one of the field devices 15-22. In some instances, the tool 100 only powers a single one of the field devices 15-22 at any given time.

Figure 2:
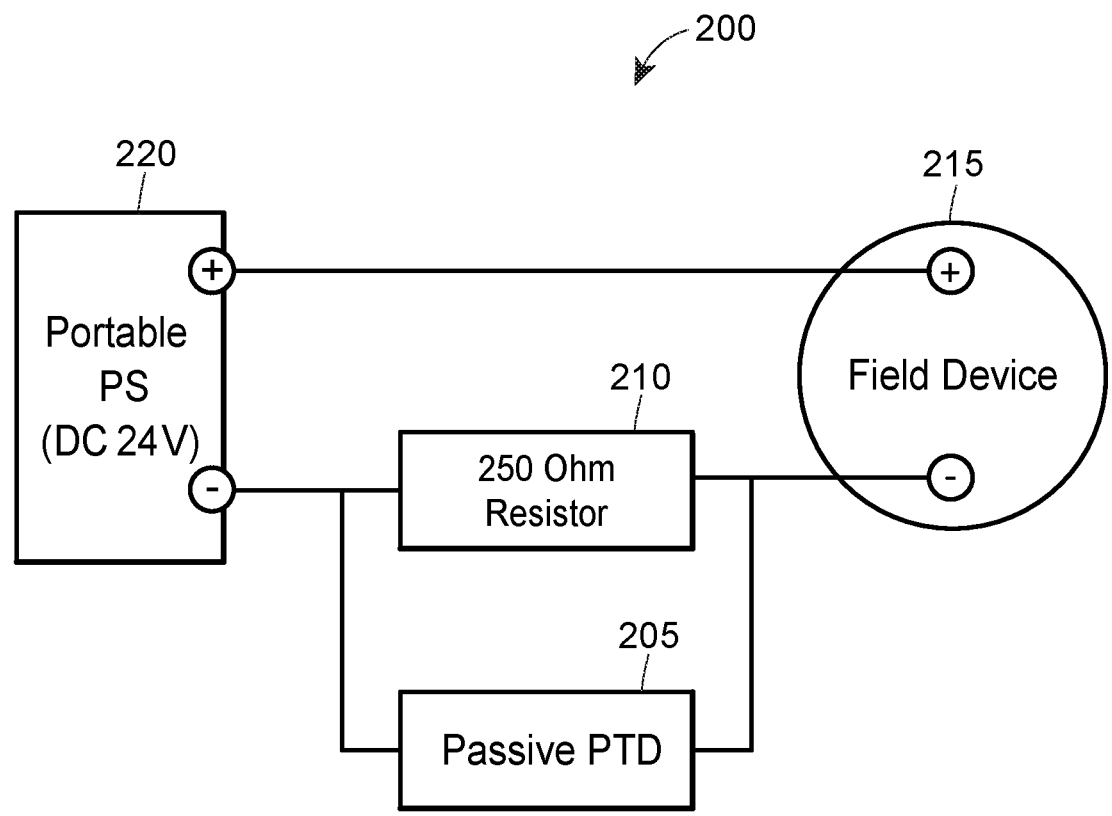
FIG. 2 is a schematic of a prior art passive PTD communicatively connected to a HART field device.

FIG. 2 is a schematic of a prior art PTD 205 that is connected, via a HART loop 200A, to a HART field device 215 and that requires the use of a portable power supply 220. Unlike the tool 100, the PTD 205 cannot supply power to the field device 215, and is thus inconvenient for technicians. Further, the portable power supply 220 may not comply with IS standards, making it unsuitable for use in hazardous areas. Finally, unlike the tool 100, the PTD 205 requires a loop resistor 210, connected in parallel with the PTD 205 to the loop 200A, to communicate with the field device 215.

As noted, the PTD 205 does not supply power to the field device 215. The field device 215 is instead powered by a portable power supply 220. FIG. 2 represents a scenario in which the field device 215 is being bench tested or in which the field device 215 is isolated from its normal power source in the field. Because the PTD 205 does not supply power to the field device 215, a technician may need to carry the portable power supply 220, in addition to the PTD 205, to the field device 215 when servicing it in the field.

As further noted, the power supply 220 may not comply with IS standards. Thus, if the field device 215 is in a hazardous area, the technician may not be able to supply power to the field device 215, and consequently may not be able to utilize the PTD 205 to service the field device 215. Typical portable power supplies often cannot safely be used in hazardous areas because they are usually not compliant with IS standards. In particular, typical portable power supplies are often vulnerable to component failures that may result in voltage, current, and/or temperature spikes sufficient to ignite an explosive atmosphere. It should be noted that if the PTD 205 were to be made "active" by adding a power supply, it would suffer many of the same problems suffered by portable power supplies regarding IS standards.

Finally, the PTD 205, like many prior art PTDs, requires the external 250 ohm loop resistor 210 to communicate with the HART field device 215. By comparison, the tool 100 may include an internal resistor network that provides sufficient resistance to read a signal on a link such as the loop 200A, and thus does not require the use of the external resistor 210. The external resistor 210 provides sufficient loop resistance to enable the PTD 205 to detect a voltage on the loop 200A, which is necessary for reading the signal carried by the loop 200A (i.e., the PTD 205 interprets the detected voltage as a signal value). In this example, the PTD 205 might interpret an analog value (e.g., a tank level measurement between 0% full and 100% full) based on the particular value of the detected voltage within a range of 1 V-5 V (e.g., wherein 1 V=0% and 5V=100%). For example, when the loop current is 20 mA, the PTD 205 detects 5 V (i.e., 20 mA*250) and when the loop current is 4 mA, the PTD detects 1 V (i.e., 4 mA*250). Further, the PTD 205 might interpret the digital component of a HART signal based on the detected voltage. The digital component of a HART signal generally varies by about 1 mA peak-to-peak. Thus, the 250 ohm resistor 210 enables the PTD 205 to detect a voltage, corresponding to this digital component, of about 250 mV (1 mA*250). If a smaller resistor were used (or no resistor were used), the voltage associated with the signaling on the loop 200A might drop to levels undetectable by the passive PTD. By comparison, the tool 100 may utilize an internal resistor network having a resistance below 250 ohms, enabling the tool 100 to read a signal on the HART loop 200a while complying with IS energy limitations.

Figure 3:
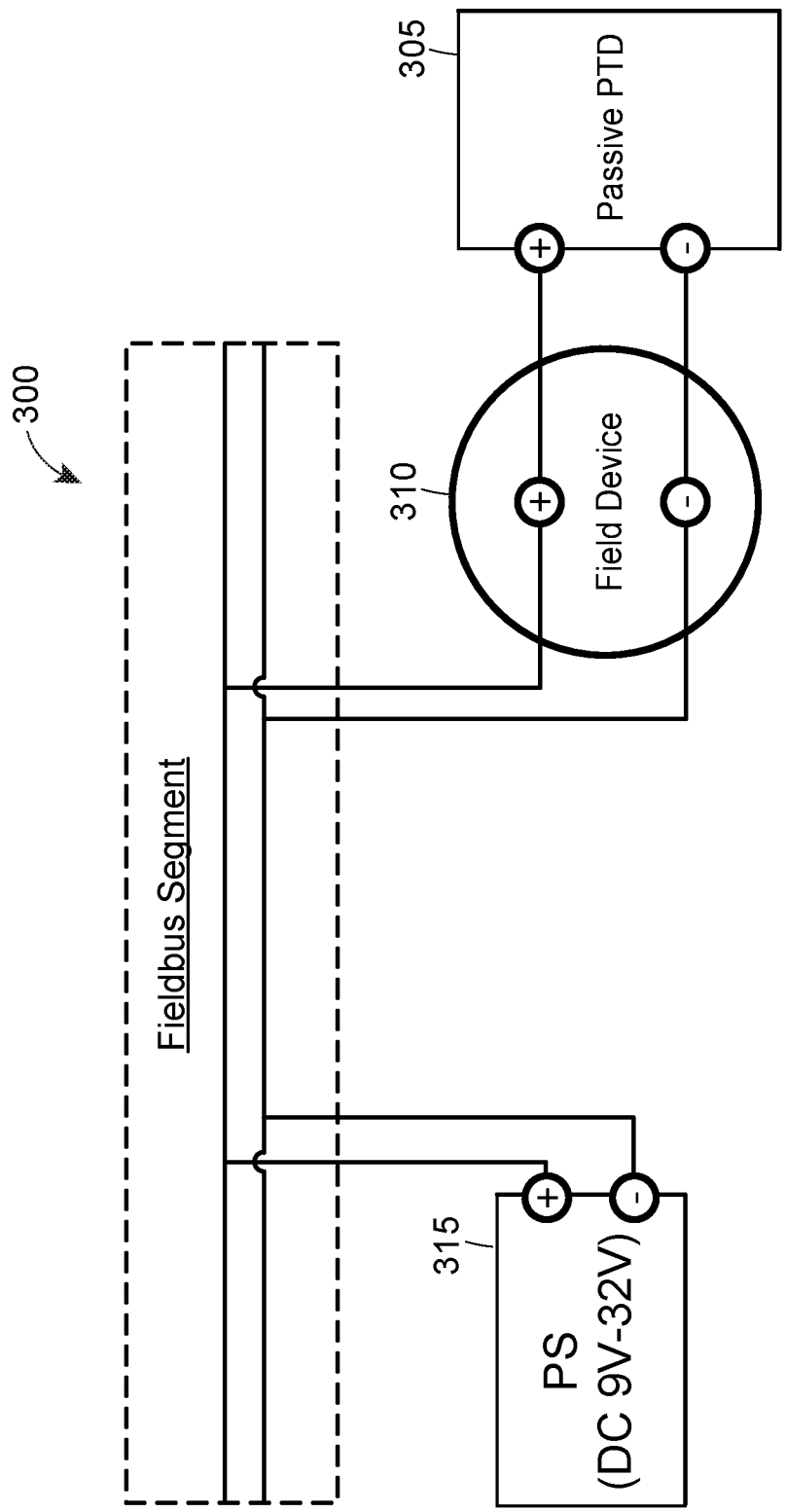
FIG. 3 is a schematic of a prior art passive PTD communicatively connected to a Fieldbus field device.

FIG. 3 is a schematic of a prior art PTD 305 communicatively connected to a Fieldbus field device 310 that is powered by a Fieldbus power supply 315 via a Fieldbus segment 300. The PTD 305 is similar to the PTD 205 in that it does not supply power to the field device 310, and is thus inconvenient for technicians. That is, when a technician is servicing the field device 310, he or she generally relies on the power supply 315 or a portable power supply (not shown) to power the field device 315. By comparison, the tool 100 can supply power to a field device such as the field device 310, even when the field device 310 is located in a hazardous area.

Figure 4:
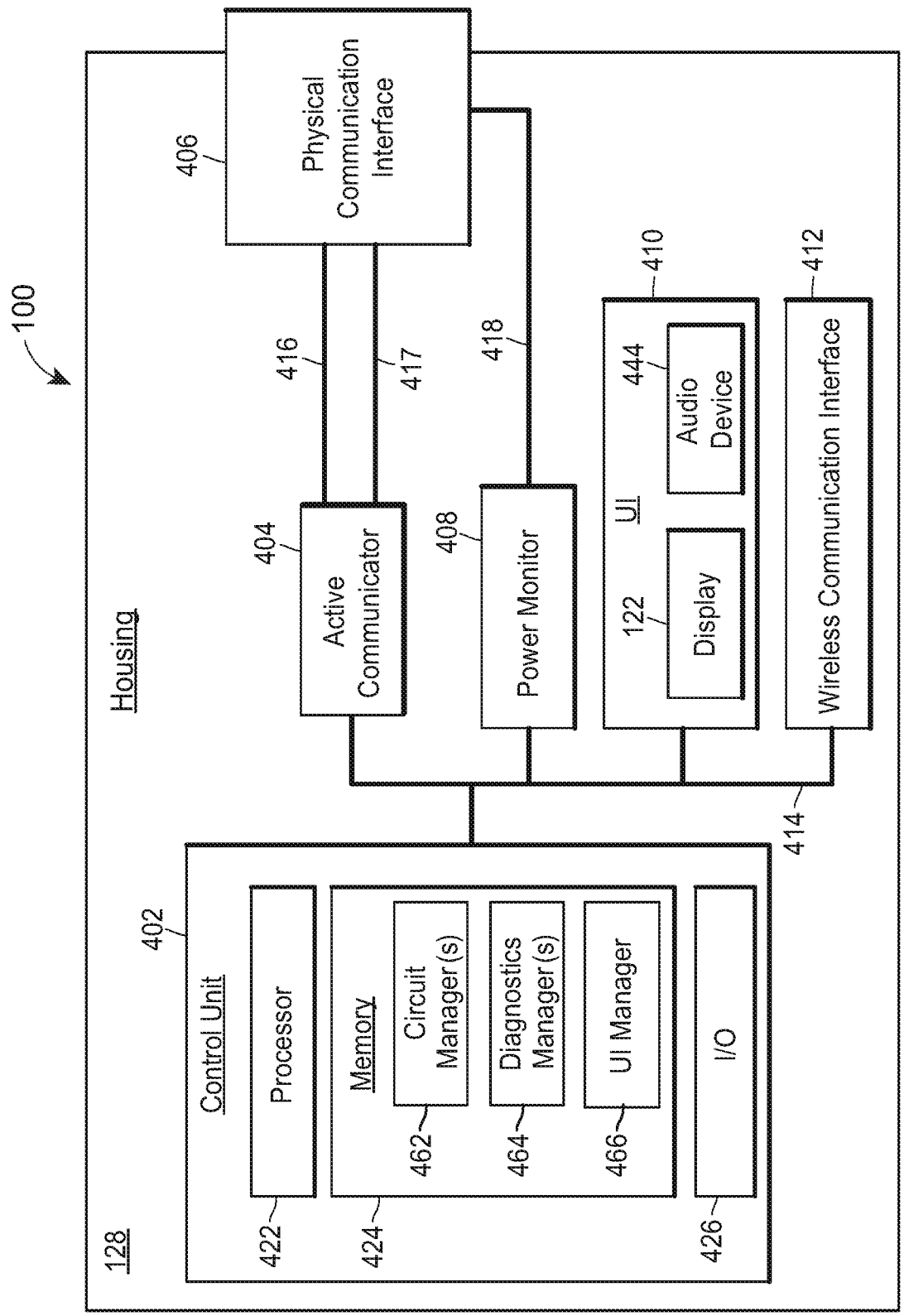
FIG. 4 is a block diagram of the portable field maintenance tool shown in FIG. 1A, depicting an example in which the portable field maintenance tool includes an active communicator for powering and communicating with field devices.

FIG. 4 is a block diagram of the tool 100, depicting an example in which the tool 100 includes an active communicator 404 and a physical communication interface 406 electrically connected via electrical connections 416 and 417 to the active communicator 404 so that the active communicator 404 can power and communicate with the field device 160 via the physical communication interface 406, as well as measure one or more electrical characteristics of signals sent or received by the active communicator 404. As shown, the communication interface 406 may be disposed through the housing 128, such that an external portion of the interface 406 is accessible outside the housing 128, enabling the communication link 150 and field device 160 to be connected to the interface 406.

The active communicator 404 enables the tool 100 to communicate with the field device 160, diagnose the field device 160, power the field device 160, and/or diagnose a communication link in a plant environment to which the field device 160 is connected (not shown). In some cases, the active communicator 404 may be configured to communicate with and diagnose multiple different types of field devices (e.g., HART field devices and Fieldbus field devices), and/or may be configured to comply with IS standards so that it can be used to communicate with, diagnose, and power field devices located in hazardous areas. The one or more power supplies of the active communicator 404 may include switches for disabling the power supplies.

The active communicator 404 may include a power supply for supplying power to the field device 160, a signal encoder and decoder (e.g., a modem) for communicating with the field device 160, and/or energy measurement circuitry (e.g., a voltmeter and/or ammeter) for measuring electrical characteristics of signals sent and received by the active communicator 404. The active communicator 404 may transmit or receive communication signals to or from the field device 160 via the electrical connections 416 and 417. The active communicator 404 may encode communication signals by modulating a current magnitude or a frequency to represent an analog or digital value, and may superimpose the communication signal on a power signal to create a composite signal.

The tool 100 may include a control unit 402, communicatively coupled to the active communicator 404 via a communication bus 414, configured to control and monitor the active communicator 404. At a high level, the control unit 402 may activate and deactivate components of the active communicator 404 to: (i) configure the active communicator 404 so that it remains energy limited in accordance with IS standards; (ii) configure the active communicator 404 to communicate according to a desired communication protocol (e.g., HART or Fieldbus); (iii) configure the active communicator 404 in response to a connection made at the physical communication interface 406 (e.g., based on whether a user connects the communication link 150 to a terminal set for HART or a terminal set for Fieldbus); and/or (iv) configure the active communicator 404 for a particular field device configuration or field device type (e.g., actuator or transmitter). Generally speaking, a transmitter is a field device configured to obtain a measurement (e.g., via a temperature sensor, pressure sensor, flow sensor, level sensor, etc.) and to transmit the measurement. The field device configuration or type may be determined based on user input or based on communication with the connected field device.

The control unit 402 may include a processor 422, a memory 424 storing one or more routines, and an I/O interface 426 communicatively coupled to other components of the tool 100 via the bus 414. The routines stored at the memory 424 may include a circuit manager routine 462 for activating and deactivating components of the active communicator 404 as described above and a diagnostics manager routine 464 for diagnosing signals sent and received by the active communicator 404.

The tool 100 may also include a user interface ("UI") 410, communicatively coupled to the control unit 402 via the bus 414, for providing a user interface and/or for detecting user input received at the UI 410 (e.g., touch input). The control unit 402 may provide the user interface at the UI 410 and detect the user input at the UI 410 by executing a UI manager 466 stored at the memory 424. The UI 410 may include the display 122 shown in FIG. 1A, where the control unit 402 may render visual output; and an audio device 444 for providing audio output. For example, the UI 410 may render a graphical user interface that enables a user to select a communication protocol for communicating with the field device 160, to select a command to transmit to the field device 160, to view information transmitted from the field device 160 to the tool 100, etc. The audio device 444 may generate audio alarms or notifications, for example, in response to alarms transmitted by the field device 160.

Further, the tool 100 may include a power monitor 408 (e.g., an ammeter), communicatively coupled to the control unit 402 via the bus 414, for measuring a current or voltage associated with the communication link 150 connected to the interface 406. The diagnostics manager 464 of the control unit 402 may utilize the power monitor 408 to measure a signal transmitted and/or received by the tool 100 to determine whether the signal has electrical characteristics within an expected range for a particular protocol. For example, if a user utilizes the tool 100 to attempt to command a HART valve to open to 50%, the power monitor 408 may be utilized to verify that the transmitted signal has a current at or near a level that will enable the HART valve to properly interpret the signal (e.g., 12 mA). The UI manager 464 may display measurements obtained by the power monitor 408. In some cases, the tool 100 does not include the power monitor 408. However, regardless of whether the tool 100 includes the power monitor 408, the tool 100 may rely on electrical measurements obtained by the active communicator 404.

The tool 100 may also include a wireless communication interface 412, communicatively coupled to the control unit 402 via the bus 414, for transmitting and/or receiving wireless signals, enabling the tool 100 to communicate with other components of the plant 10. The wireless interface 412 may support one or more suitable wireless protocols, such as Wi-Fi (e.g., an 802.11 protocol), Bluetooth (e.g., 2.4 to 2.485 GHz), near-field communications (e.g., 13.56 MHz), high frequency systems (e.g., 900 MHz, 2.4 GHz, and 5.6 GHz communication systems), etc. In some cases, the tool 100 does not include the wireless communication interface 412.

Figure 5A:
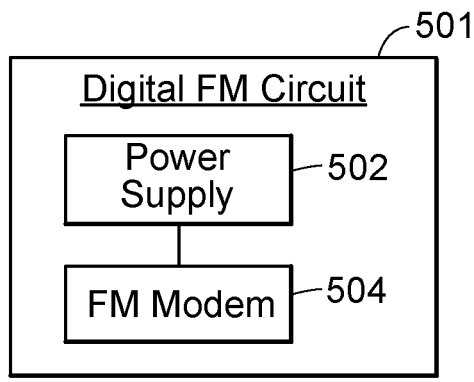
FIG. 5A is a block diagram of an active communicator, configured for digital frequency modulation communication, that may be found in the portable field maintenance tool shown in FIG. 1A.
Figure 5B:
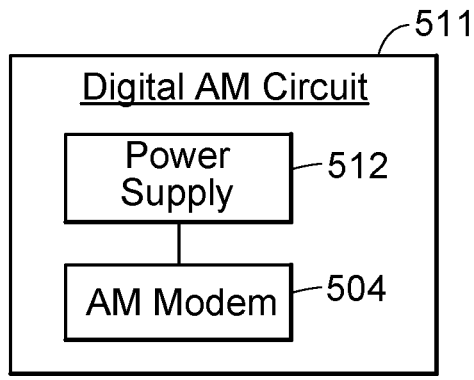
FIG. 5B is a block diagram of an active communicator, configured for digital amplitude modulation communication, that may be found in the portable field maintenance tool shown in FIG. 1A.
Figure 5C:
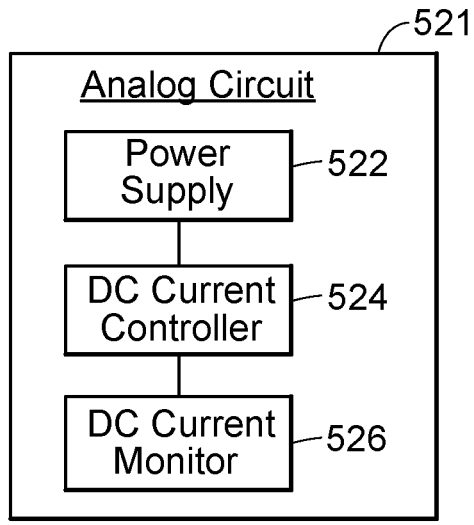
FIG. 5C is a block diagram of an active communicator, configured for analog communication, that may be found in the portable field maintenance tool shown in FIG. 1A.

FIGS. 5A-5C are block diagrams of active communicators 501, 511, and 521, each of which is an example of the active communicator 404 shown in FIG. 4, that are configured to communicate according to different communication schemes. Depending on the embodiment, each of the active communicators 501, 511, and 512 may be communicatively coupled to the control unit 402 via the bus 414 and may be electrically connected to the communication interface 406 via the electrical connections 416 and 417 shown in FIG. 4.

The active communicator 501 shown in FIG. 5A is a digital frequency modulation ("FM") circuit, and may include a power supply 502 and an FM modem 504, each of which may be electrically connected, directly or indirectly, to the electrical connection 416 and 417. The power supply 502 may provide power to the field device 160 connected to the interface 406 via a DC signal. The FM modem 504 may transmit information to and/or receive information from the field device 160 (via the interface 406) using a frequency modulation scheme, such as the HART protocol. For example, to transmit information, the FM modem 504 may superimpose an AC communication signal onto a DC signal provided by the power supply 502. The FM modem 504 may encode digital communication signals by modulating the frequency of an AC communication signal, wherein a first frequency (or frequency range) represents a digital 0 and a second frequency (or frequency range) represents a digital 1. For example, the FM modem 504 may encode a communication signal by modulating the frequency of the communication signal at 1200 Hz (representing a digital 1) and 2200 Hz (representing a digital 0). To receive information, the FM modem 504 may interpret a first frequency or frequency range as a digital 0, and may interpret a second frequency or frequency range as a digital 1.

The active communicator 511 shown in FIG. 5B is a digital amplitude modulation ("AM") circuit, and may include a power supply 512 and an AM modem 514, each of which may be electrically connected, directly or indirectly, to the electrical connections 416 and 417. The power supply 512 may provide power to the field device 160 connected to the interface 406 via a DC signal. The AM modem 514 may transmit information to and/or receive information from the field device 160 using an amplitude modulation scheme, such as the Fieldbus protocol. For example, to transmit information, the AM modem 511 may superimpose an AC communication signal onto a DC signal provided by the power supply 512. The AM modem 511 may encode digital communication signals by modulating the amplitude of an AC communication signal, wherein a first amplitude (or amplitude range) represents a digital 0 and a second amplitude (or amplitude range) represents a digital 1. For example, the first range may be 7.5 mA to 10 mA and the second range may be −7.5 mA to −10 mA. In some circumstances, transitions from the first amplitude or amplitude range to the second amplitude or amplitude range may represent a digital 0, and transitions from the second amplitude to the first amplitude may represent a digital 1. Thus, the AM modem 514 may control the current magnitude of the communication signal to cause transitions between the first and second range to encode digital 1s and 0s onto the communication signal. To receive information, the AM modem 514 may interpret a first amplitude, amplitude range, and/or transition between amplitudes (e.g., high-to-low) as a digital 0, and may interpret a second amplitude, amplitude range, and/or transition between amplitudes (e.g., low-to-high) as a digital 1.

Turning to FIG. 5C, the active communicator 521 is an analog circuit, and may include a power supply 522, a DC current controller or current sink 524, and/or a DC current monitor 526, each of which may be electrically connected, directly or indirectly, to the electrical connections 416 and 417. The active communicator 521 may encode information by causing the current controller 524 to draw current at a particular magnitude within a range (e.g., 4-20 mA). Example information encoded by the active communicator 521 includes a command to open a valve to 100% open (e.g., 20 mA) or to 0% open (e.g., 4 mA). The field device 160 that receives the encoded signal may be configured to receive the signal and interpret the current magnitude as a particular command or value. The active communicator 521 may additionally or alternatively decode a signal from a field device 160 by measuring, via the current monitor 526, the current magnitude of the received signal. Example information encoded by a field device 160 (to be decoded by the active communicator 521 and/or control unit 402) includes a flow measurement (e.g., wherein the field device 160 is calibrated to report measurements within a range of 0-100 gallons per minute by transmitting a corresponding 4-20 mA signal).

In some cases, the tool 100 may include only one of the active communicators 501, 511, and 521; while in other cases, the tool 100 may include two or more of the active communicators 501, 511, and 521. When the tool 100 includes multiple ones of the active communicators 501, 511, and 521, the tool 100 may be capable of communicating with and/or diagnosing multiple field devices that operate according to different protocols (e.g., HART field devices and Fieldbus field devices). Advantageously, a user can carry a single tool in the plant for testing multiple types of field devices, saving the user the trouble of carrying a different tool for each different type of field device.

When the tool 100 includes multiple ones of the active communicators 501, 511, and 521, the interface 406 may include a terminal set for each of the active communicators 501, 511, and 521. In some instances, the active communicators 501 and 521 may share a power supply and/or a terminal set. In such instances, the active communicators 501 and 521 may utilize a single composite signal that is modulated in both current amplitude and frequency to carry information. For example, the active communicator 521 may transmit and/or receive information by varying or measuring an amplitude of a DC signal between 4-20 mA. The active communicator 501 may then superimpose an AC communication signal (e.g., 1 mA peak-to-peak) onto the modulated DC signal.

Figure 6:
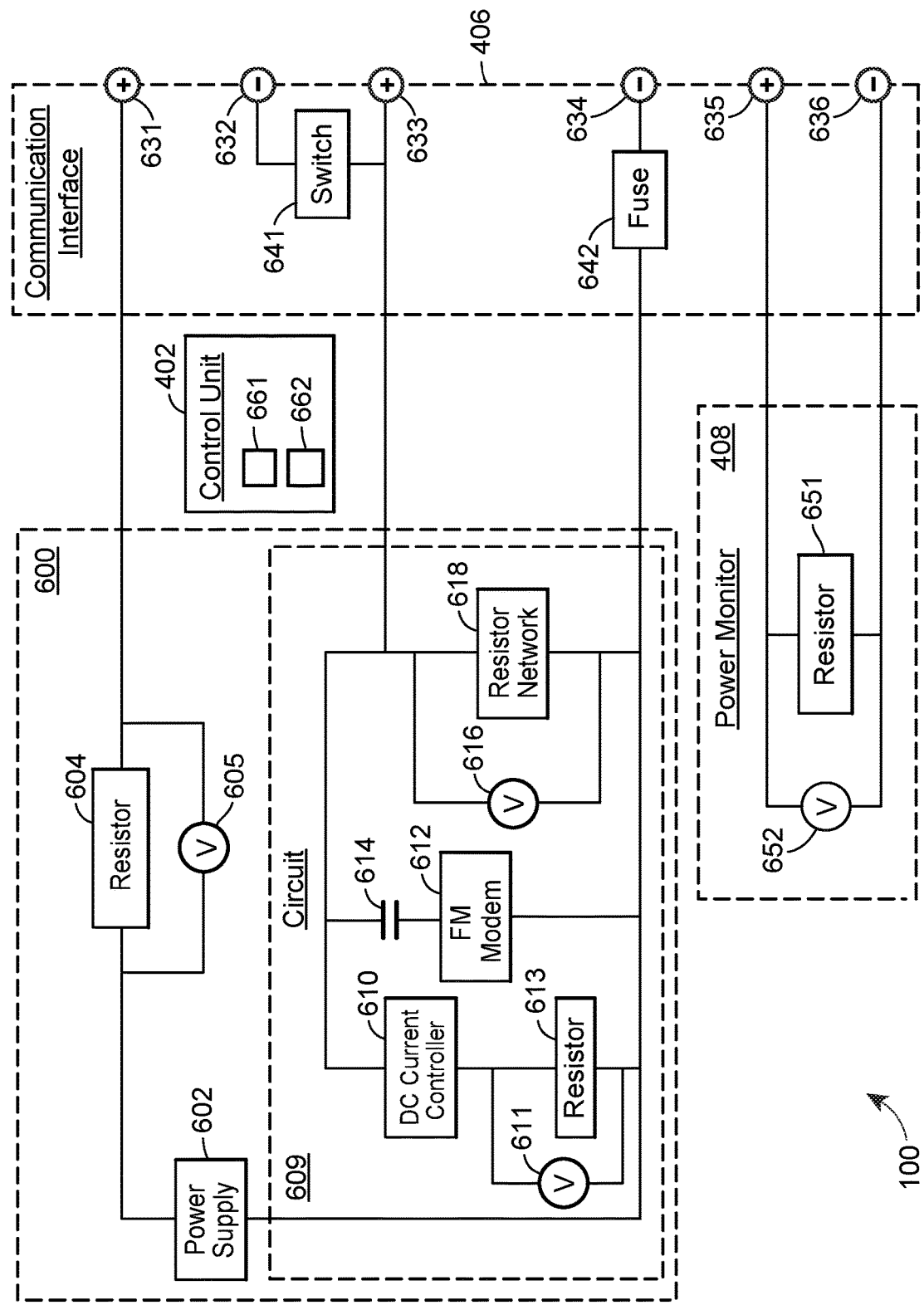
FIG. 6 is a schematic of an active communicator that may be found in an example portable field maintenance tool and that may enable communication via a digital frequency modulation communication protocol, such as the HART protocol.

FIG. 6 is a schematic of an active communicator 600 (which may be an example of the active communicator 404 shown in FIG. 4) for the tool 100 that may be electrically connected to the field device 160 shown in FIG. 1A via the communication interface 406 to: (i) supply power to the field device 160 by way of a DC signal (e.g., 4 mA); (ii) communicate with the field device 160 by way of a current modulated signal biased (e.g., at 4-20 mA) on top of the DC power signal; and (iii) communicate with the field device 160 by way of a digital FM signal superimposed on the analog current modulated signal. Advantageously, the active communicator 600 may be utilized to communicate with and/or diagnose HART field devices. In some cases, the active communicator 600 may be energy limited and fault tolerant according to IS standards, and enabling the active communicator 600 and the tool 100 to power, communicate with, and/or diagnose field devices and communication links located in hazardous areas.

As noted, the active communicator 600 may communicate with the field device 160 utilizing two simultaneous communication channels: a current modulated analog signal and a frequency modulated digital signal superimposed on the analog signal. Generally speaking, the analog signal communicates a primary measured value (e.g., a flow, pressure, temperature, etc.) when the field device 160 is a transmitter and communicates a command (e.g., to open or close a valve) when the field device 160 is an actuator. The digital signal may contain information from the field device 160 including a device status, diagnostics, additional measured or calculated values, etc.

The active communicator 600 may include one or more of the following, each of which may be communicatively coupled to the control unit 402 via a communication bus (not shown): a power supply 602, a resistor 604, and a communication circuit 609. The communication circuit 609 may include energy measurement circuitry (e.g., the voltage monitors 611 and 616) that measures electrical characteristics of signals sent and/or received by the tool 100. The diagnostics manager 662 may analyze the electrical characteristics to verify the signals are within an expected range for a given protocol (e.g., 4-20, HART, Fieldbus, etc.) or for IS standards. The power supply 602 may supply the power signal provided by the active communicator 600, and the communication circuit 609 may encode and decode communication signals transmitted and/or received by the active communicator 600.

The power supply 602, which may be designed to supply any desired voltage (e.g., any value between 20 V and 29 V), may be communicatively coupled to the control unit 402. In some cases, the power supply 602 may be designed to never exceed: (i) a maximum voltage threshold (e.g., any desirable value between 23 V and 30 V), or (ii) a maximum current threshold (e.g., any desirable value between 20 mA an 35 mA). In some cases, the power supply 602 may be designed to be voltage limited and/or current limited even when experiencing one or more faults, and/or may be designed to perform a ramped start-up or soft start during which it ramps to a desired voltage over a period of time, thus mitigating against the chance of current spikes. In some instances, the current and/or voltage of the power signal provided by the power supply 602 may be measured so that the control unit 402 can shut down the power supply 602 when a measured voltage or current exceeds a maximum threshold or fails to exceed a minimum threshold. A measured voltage exceeding a maximum threshold may indicate that someone added an external power source to the field device to which the tool 100 is connected, which may cause the loop to violate IS standards and/or may damage components of the tool 100 or of other devices connected to the loop. A measured voltage failing to exceed a minimum threshold may indicate that a circuit has shorted or that the capacity of the power supply 602 has been exceeded. A measured current exceeding a maximum threshold may indicate that a circuit has shorted or that the power supply 602 is limited at its maximum load. A measured current failing to exceed a minimum threshold may indicate that no field device is connected to the tool 100.

The power supply 602 may be electrically connected to the communication interface 406 via the resistor 604, which may have any desirable resistance (e.g., 200-300 ohms). The resistor 604 may function to induce a voltage drop sufficient to ensure that a voltage drop at the communication interface 406 remains below a threshold. For example, if the power supply 602 is supplying a current of 25 mA, the resistor 604 may induce a voltage drop of 6.25 V (i.e., 0.025 A*250 ohms). In cases where the power supply 602 is a 23 V power supply, for example, this may result in a maximum potential output voltage of 16.75 V. As shown, the active communicator 600 also includes a voltage monitor 605 that measures a voltage drop across the resistor 604 and transmits the measured voltage drop to the control unit 402. The voltage monitor 605 may function as a current monitor for the power supply 602. For example, the control unit 604, which may be communicatively coupled to the voltage monitor 605, may rely on the measured voltage drop to calculate a current flowing through the resistor 604. In some cases, the active communicator 600 may include an ammeter placed between the power supply 602 and the resistor 604.

As noted, the active communicator 600 may include the communication circuit 609, which may include: (i) a DC current controller 610 (such as the DC current controller 524 in FIG. 5) to transmit a signal by controlling the current magnitude of an analog DC signal; (ii) a resistor 613 and voltage monitor 611 for measuring a voltage drop across the resistor 613, which is utilized by the control unit 402 and diagnostics manager 662 to calculate a current transmitted by the DC current controller 610; (iii) a resistor network 618 for receiving and interpreting an analog DC signal, and (iv) an FM modem 612 (such as the FM modem 504 in FIG. 5) to communicate by encoding or decoding a digital FM signal. One or more components of the communication circuit 609 may be switched out if desired. Generally speaking, the DC current controller 610 is used to transmit DC signals (e.g., 4-20), the resistor network 618 is used to receive and interpret DC signals (e.g., 4-20), and the FM modem 612 is used to transmit and receive digital signals (e.g., the digital component of a HART signal superimposed on a 4-20 signal). Accordingly, when connected to an actuator, the circuit manager 661 of the control unit 402 may activate the DC current controller 610 and may disable the resistor network 618. When connected to a transmitter, the circuit manager 662 may activate the resistor network 618 and disable the DC current controller 610. Generally speaking, the FM modem 612 will be enabled when connected to both actuators and transmitters.

The DC current controller 610 may be configured to draw a DC current (e.g., 4-20 mA) when the active communicator 600 is connected to an actuator, and may be controlled by the control unit 402 (e.g., in response to a user's input provided at the UI 410). For example, a user may initiate a command to open a valve to 75% open. Based on this detected input, the control unit 402 may cause the DC current controller 610 to draw a current corresponding to a command to open the valve to 75% open (e.g., 16 mA). The DC current controller 610 may abruptly adjust current levels or gradually ramp current levels, depending on a user specified value. When the active communicator 600 is connected to a transmitter, the DC current controller 610 may be switched out of the communication circuit 609 (via a switch not shown) to avoid interfering with the DC current modulation of the transmitter.

The resistor network 618 may have any desired resistance (e.g., any desired value between 100 ohms and 1000 ohms) and may be adjustable (e.g., by the control unit 402). In some instances, the resistor network 618 has a resistance of 167 ohms. The voltage monitor 616 may measure a voltage drop across the resistor network 618, which may be utilized to measure current flowing through the resistor network 618. As an example, in a HART implementation, the voltage monitor 616 may measure a voltage between 3.34 V (20 mA*167 ohms) and 0.668 V (4 mA*167 ohms). The digital component of the HART signal, which typically modulates at 1 mA peak-to-peak, may be detected as a peak-to-peak voltage across the resistor network 618 of 0.167 V (1 mA*167 ohms). Importantly, this is above 0.12 V, a minimum voltage threshold typically needed to read the digital component of a HART signal. The resistor network 618 is described in more detail with reference to FIG. 7.

The FM modem 612, like the FM modem 504, may transmit information and/or receive information using a frequency modulation scheme, such as the HART protocol. The capacitor 614 filters DC current.

The communication circuit 609 may further include a capacitor 614 in series with the FM modem 612 to filter DC current so that the FM modem 612 can receive and transmit the AC component of the signal, and a voltage monitor 616, communicatively coupled to the control unit 402, configured to measure a voltage drop across the resistor network 618. The control unit 402, knowing the resistance of the resistor network 618, may calculate the current flow through the resistor network 618 based on the measured voltage.

As noted, the communication circuit 609 may be electrically connected to the communication interface 406 to send and receive communication signals. Further, the power supply 602 may be electrically connected to the communication interface 406 to supply a power signal to the field device 160 via the communication interface 406. The communication interface 406 may include terminals 631-636 for connecting to one or more field devices, and/or fuses 641 and 642 to limit current flowing through the active communicator 600. Generally speaking, the field device 160 may be a transmitter configured to report a measurement by modulating a DC current (e.g., 4-20 mA) or an actuator configured to actuate in a particular manner in response to the magnitude of a received DC current (e.g., 4-20 mA).

The communication interface 406 may be electrically connected to the power monitor 408 shown in FIG. 4, which may include a resistor 651 and a voltage monitor 652. The resistor 651 may have a resistance sufficiently low to avoid a significant voltage drop. In some cases, the resistor 651 has a resistance between 0 and 10 ohms (e.g., 2.43 ohms), which may be selected to minimize the voltage drop over the resistor 651. The voltage monitor 652 may measure the voltage drop across the resistor 651 and transmit the measured voltage to the control unit 402. The control unit 402, knowing the resistance of the resistor 651, may calculate the current flow through the resistor 651. In some cases, a fuse may be placed between the terminal 635 and the power monitor 408.

In operation, the active communicator 600 may be configured to operate in a "tool-power mode" (i.e., where the active communicator 600 provides power to the connected field device 160) and in a "loop-power mode" (i.e., where the connected field device 160 relies on, e.g., a portable external power supply instead of the active communicator 600 for power). The communication interface 406 may include a first terminal set (e.g., terminals 631 and 632) for tool-power mode and a second terminal set (e.g., terminals 633 and 634) for loop-power mode. Further, the active communicator 600 may be configured to operate in a "transmitter connection mode" and an "actuator connection mode." Thus, the communication interface 406 may be configured to facilitate four different configurations or types of connections: (i) tool-power transmitter connection, wherein the active communicator 600 supplies power to a transmitter; (ii) loop-power transmitter connection, wherein the active communicator 600 connects to a powered transmitter field device (in some scenarios the loop to which the loop-powered transmitter is connected includes a loop resistor, enabling communication; in others the loop does not include a loop resistor. When a loop resistor is not present, the tool 100 may activate or adjust the resistor network 618 to provide sufficient loop resistance for communication); (iii) tool-power actuator connection, wherein the active communicator 600 supplies power to an actuator; and (iv) loop-power actuator connection, wherein the active communicator 600 connects to a powered actuator (in some scenarios the loop-powered actuator includes a DC current controller; in others it does not).

For a tool-power transmitter connection, the active communicator 600 may activate a "tool-power" mode and/or a "transmitter connection" mode. The active communicator 600 may activate one or both of these modes in response to user input (e.g., via the screen 122 and/or via the buttons 132 shown in FIG. 1A). In some cases, the active communicator 600 may activate "tool-power" mode in response to detecting that the terminals 631 and 632 have been connected to the field device 160. In other cases, the active communicator 600 instead activates "tool-power" mode based on input from a user. If desired, the active communicator 600 may perform one or more power or communications checks or verifications before activating "tool-power mode." In some instances, the active communicator 600 may activate the "transmitter connection" mode in response to detecting that a connected field device is a transmitter. In other instances, the active communicator 600 instead activates the "transmitter connection" mode based on input from a user. Further, the active communicator 600 may perform a power verification after power is enabled to verify that the field device 160 is behaving as expected (e.g., behaving as expected for a transmitter or actuator). The active communicator 600 may also verify that the field device 160 is connected, that power supply limits are not exceeded, and/or that no circuits have unexpectedly shorted.

For a tool-power transmitter connection, a user may connect a transmitter to the terminals 631 and 632. When connected to a transmitter, the current controller 610 may be switched out of the network via a switch (not shown) because the active communicator 600 is not modulating DC current to transmit a command. After the transmitter has been connected, the power supply 602 may ramp up power. Power may be ramped slowly to avoid current spikes. Current may flow from the power supply 602, through the resistor 604 and terminal 631, to the transmitter. The transmitter may draw a certain level of baseline current for power (e.g., up to 4 mA). The transmitter may then draw additional current based on its configuration and based on a measurement it has performed (e.g., a measured flow, pressure, tank level, etc.). As an example, a current draw by the transmitter of 4 mA may represent a live-zero for the transmitter's configured measurement range (e.g., 0 gpm), and a current draw by the transmitter of 20 mA may represent a measurement at the top of the configured measurement range (e.g., 100 gpm). A current draw between 4-20 mA may represent a proportional measurement within the configured measurement range (e.g., 12 mA=50 gpm). In some instances, the tool 100 generates a high alarm when a current of 22.5 mA or higher is detected and/or generates a low alarm when a current of 3.75 mA or lower is detected.

Current may flow from the terminal 631 to the transmitter and back through the terminal 632, through a switch 641. The received current may flow to the circuit 609. As noted, the capacitor 614 filters DC current and the DC current controller 610 may be switched out when the active communicator 600 is connected to a transmitter. Accordingly, the DC component of the received signal flows through the resistor network 618, where the voltage monitor 616 may measure the voltage drop across the resistor network 618 so that the control unit 402 can determine the magnitude of the received DC current. The control unit 402 may determine a variable value (e.g., a flow rate) based on the determined magnitude.

Because the capacitor 614 allows AC current to pass, the AC component of the signal may flow to the FM modem 612. The FM modem 612 may then decode a digital signal carried by the received AC component in a manner similar to that described regarding the FM modem 504. Further, the FM modem 612 may also transmit information to the transmitter by encoding a digital signal (superimposed onto the DC signal) in a manner similar to that described regarding the FM modem 504.

For a loop-power transmitter connection, a user may connect a powered transmitter to the terminals 633 and 634. The active communicator 600 may activate one or both of "loop-power mode" and/or "transmitter connection mode" in response to user input (e.g., via the screen 122 and/or via the buttons 132 shown in FIG. 1A). In some cases, the active communicator 600 activates "loop-power" mode in response to detecting that the terminals 633 and 634 have been connected to a field device (e.g., via a link 150). In other cases, the active communicator 600 instead activates "loop-power" mode based on input from a user. The active communicator 600 may activate "loop-power" mode after verifying that no voltage exists at any other terminals of the communication interface 406.

The tool 100 may include a fuse 642, electrically connected to the terminal 634, configured to limit current to a particular threshold. In some cases, the fuse 642 is not included. In some cases, the fuse 642 is placed between the terminal 634 and ground. In the same manner as that described with respect to the tool-power transmitter connection, the circuit 609 may decode a DC component of a received signal (e.g., 4-20 mA) and may modulate and demodulate an AC component of the signal (e.g., a superimposed frequency modulated 1 mA peak-to-peak signal) to transmit information to and receive information from the transmitter.

For a tool-power actuator connection, a user may connect an actuator to the terminals 631 and 632. The active communicator 600 activates one or both of "tool-power mode" and/or "actuator connection mode" in response to user input (e.g., via the screen 122 and/or via the buttons 132 shown in FIG. 1A). The power supply 602 may supply power to the actuator in a manner similar to that described regarding a tool-power transmitter connection.

In this mode of operation, a switch (not shown) may activate the DC current controller 610 if the DC current controller 610 is switched out of the circuit 609. The DC current controller 610 may draw a DC current (e.g., 4-20 mA), which may be supplied by the power supply 602 and may flow through the terminal 631 to the actuator, and then back through the terminal 632 to the DC current controller 610. The magnitude of the current acts as a command for the actuator. The current resistor network 618 and voltage monitor 616 may be switched out of the circuit 609 by the control unit 402 via a switch (not shown) when the DC current controller 610 is active because the circuit 609 is not interpreting a modulated DC current in this mode.

Because the capacitor 614 allows AC current to pass, the AC component of the received signal may flow to the FM modem 612. The FM modem 612 may then decode a digital signal carried by the received AC component in a manner similar to that described regarding the FM modem 504, and the FM modem 612 may transmit information to the actuator by encoding a digital signal (superimposed on the DC signal) in a manner similar to that described regarding the FM modem 504.

For a loop-power actuator connection, a user may connect a powered actuator to the terminals 633 and 634, and the active communicator 600 may activate one or both of "loop-power mode" and/or "actuator connection mode" in response to user input (e.g., via the screen 122 and/or via the buttons 132 shown in FIG. 1A). In the same manner as that described with respect to a tool-power transmitter connection, the circuit 609 may modulate a DC component of a signal (e.g., 4-20 mA) to transmit a command to the actuator, and may modulate and demodulate an AC component of the signal (e.g., a superimposed frequency modulated 1 mA peak-to-peak signal) to transmit information to and receive information from the actuator.

The control unit 402 may include a circuit manager routine 661 for managing the active communicator 600, and/or a diagnostics manager routine 662 for analyzing signals sent and/or received by the active communicator 600. The diagnostics manager 662 may analyze the signals based on measurements obtained from the voltage monitors 605, 611, and/or 616. In some cases, the active communicator 600 includes one or more voltage monitors that measure a voltage drop across one or more of the terminals 631-634 (e.g., across terminals 631 and 632 or across terminals 633 and 634). The diagnostics manager 662 may analyze one or more of these voltage drops prior to the circuit manager 661 activating (i.e., switching in) one or more resistors of the network 618 in order to (i) protect against activation of the resistor network 618 in parallel with an external loop resistor, and/or (ii) manage a multi-step process for activating the resistor network 618.

First, the circuit manager 661 may protect a user from enabling the resistor network 618 in parallel with an external loop resistor on an externally powered loop, which might result in a disturbance in the loop current and/or a loss in communication due to insufficient loop resistance. That is, activating the resistor network 618 while connected in parallel with an external loop resistor may drop the total loop resistance to a value too low for detecting and interpreting digital communications. To illustrate, in some cases the resistor network 618 may have a resistance of 250 ohms. Typical external loop resistors have a resistance of 250 ohms. Thus, if the resistor network 618 is activated in parallel with an external loop resistor, the total loop resistance drops to 125 ohms, which may not be sufficient resistance to induce a readable voltage drop associated with digital communications. For example, HART digital communications, which typically modulate at 1 mA peak-to-peak, generally require a voltage drop of at least 120 mVp-p. Thus, if the total loop resistance is 125 ohms, there is little margin of error before a HART digital signal becomes unreadable. To prevent the tool 100 from activating the resistor network 618 in parallel with an external loop resistor, the control unit 402 may cause the FM modem 612 to attempt digital communication upon connection. If the digital communication does not succeed, the control unit 402 may prompt the user (e.g., via the display 122 shown in FIGS. 1 and 4) to activate the resistor network 618. In some cases, the tool 100 may prevent the resistor network 618 from activating in parallel with a loop resistor by prompting the user with one or more questions and/or instructions to cause the user to connect the tool 100 with the field device in series.

Second, the measured voltages may be used to manage a multi-step process for activating the resistor network 618, which may help the tool 100 avoid exceeding voltage and/or current thresholds (which might otherwise, for example, blow the fuse 642). For example, the diagnostics manager 662 may obtain a voltage measurement from the voltage monitor 605 or from a voltage monitor across the terminals 631 and 632 (not shown). If the diagnostics manager 662 determines the power supply voltage for the power supply 602 or for an external power supply exceeds a voltage threshold (e.g., 24 V), the circuit manager 661 may prevent the resistor network 618 from activating. Activation of the resistor network 618 in such a scenario could result in excessive current (e.g., more than 50 mA) flowing through the resistor network 618, which may blow the fuse 642. If the measured power supply voltage is under the voltage threshold, the circuit manager 661 may activate the resistor network 618 with a resistance of 500 ohms. The diagnostics manager 662 may then measure current flow (e.g., based on measurements from the voltage monitor 616) and, if the measured current is below a threshold (e.g., 22.5 mA) the circuit manager 661 may adjust the resistor network 618 to a resistance of 250 ohms or 167 ohms, as desired. The fact that the measured current is below a threshold generally indicates that the connected field device is controlling the current.

The circuit manager 661 may detect a voltage decay across the terminals 631 and 632 (e.g., 0.01 V to 0.1 V drop every 50 to 100 msec). The circuit manager may take two to ten measurements over a period over 100 msec to 1 second. In response to detecting the voltage decay, the circuit manager 661 may give a user an option to activate the power supply 602 immediately rather than waiting until the voltage decays to zero.

The circuit manager 661 may activate and/or switch out one or more resistors in the network 618 when the power supply 602 is turned off to raise the resistance of the network 618 to bleed off voltage from a field device connected to the active communicator 600. Bleeding off voltage may reduce the wait time needed before the power supply 602 can be reactivated.

The circuit manager 661 may rely on a temperature sensor (not shown) disposed near the network 618 to compensate for changes in resistance attributable to temperature changes, enabling the circuit manager 661 to more accurately calculate a current flow based on measurements from the voltage monitor 616.

The circuit manager 661 may cause the DC current controller 610 to gradually change current. For example, the circuit manager 661 may implement a gradual current change in response to user input specifying a change in current over a certain number of seconds (e.g., 1, 2, 3, 4, . . . , 60 seconds, etc.).

The diagnostics manager 662 may perform one or more of the following: a loop test, a device simulation, a recorder calibration, a valve stroking, a DCS output check, a DCS input check, a zero trim calibration, or a check for isolating cable damage.

For the loop test, a user may connect a field device to: (i) the terminal set 631 and 632 or the terminal set 633 and 634, and (ii) the power monitor 408. The diagnostics manager 662 may cause the FM modem 612 to transmit a communication signal to the field device commanding the field device to draw current at various levels (e.g., 4 mA, 12 mA, 20 mA). The power monitor 408 measures the current transmitted by the field device in response. The diagnostics manager 662 may cause the tool 100 to display the requested current level and the transmitted current level, enabling the user to determine if the transmitter is appropriately responding to the commands.

For device simulation, a user may wire the tool 100 (e.g., via the terminals 631 and 632 of the active communicator 600) to a communication link in place of a field device. The diagnostics manager 662 may cause the DC current controller 610 to transmit DC current at a number of levels (e.g., in response to user input). The user, or a second user, may then verify that the connected process controller received the appropriate values.

For recorder calibration, a user may wire the tool 100 to an analog recorder and may cause the tool 100 to transmit via the DC current controller 610 preselected current values to the recorder. The user may then verify that the audio recorder received the preselected values.

For valve stroking, a user may wire the tool 100 to a valve. The diagnostics manager 662 may transmit a 4 mA signal to the valve, and the user may set a full closed stop on the valve (e.g., thereby calibrating the valve so that the full closed position corresponds to a 4 mA signal). The diagnostics manager 662 may transmit a 20 mA signal to the valve (e.g., in response to user input), and the user may set a full open stop on the valve (e.g., thereby calibrating the valve so that the full open position corresponds to a 20 mA signal). The diagnostics manager 662 may then perform a step test (e.g., in response to user input) with the DC current controller 610, transmitting current at a number of levels between 4 mA and 20 mA, to verify that the valve is appropriately calibrated to a 4-20 mA signal.

To check a DCS output, a user may wire the tool 100 to an I/O card that is typically connected to a field device (e.g., an actuator) and that is configured to transmit to the field device a 4-20 mA signal for controlling the field device. A user may coordinate (e.g., via radio) with a second user to cause a number of commands to be sent to the disconnected field device (e.g., to open or close a valve). The diagnostics manager 662 may read the received signal, and may display a current measurement, enabling the user to verify that I/O card is transmitting appropriate signals when attempting to control the field device. The tool 100 may utilize either the power monitor 408 (and terminals 635 and 636) or the voltage monitor 616 (and terminals 631 and 632) for the DCS output check.

To check DCS input, a user may wire the tool 100 to an I/O card that is typically connected to a field device (e.g., a transmitter) and that is configured to receive from the field device a 4-20 mA signal representing a measurement. The user may cause the tool 100 to send (e.g., via the DC current controller 610) a signal, and may coordinate with a second user to confirm that the controller connected to the I/O card is receiving the proper values.

To perform a zero trim calibration, the tool 100 may implement a procedure similar to that implemented for the DCS input check. For example, a user may connect the tool 100 to a field device, and may cause the field device to run a "device method" that causes the field device to output current at a number of levels. The tool 100 measures and displays the current from the field device. The user then enters at the field device the displayed current so that the field device can calibrate itself based on what it attempted to transmit and what was actually transmitted. The tool 100 may activate the power supply 602 to power the field device and the resistor network 618 to measure current from the field device, and may measure the current across the resistor network 618.

To isolate a damaged cable, a user may utilize the tool 100 to perform voltage measurements at various locations for a cable, at field device terminals, at power supply terminals, etc. A large voltage drop indicates damage.

Figure 7:
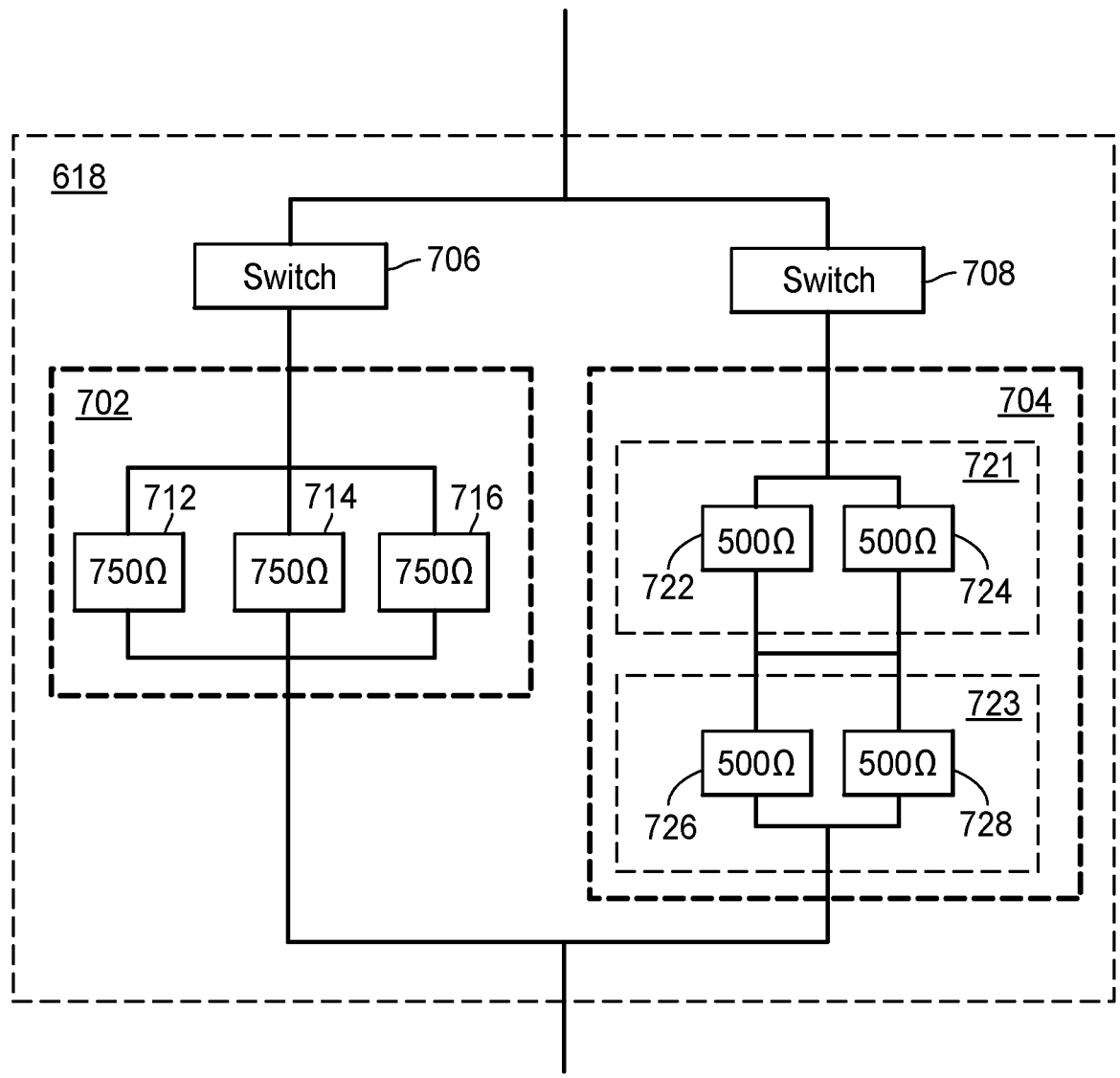
FIG. 7 is a schematic of a resistor network shown in FIG. 6.

FIG. 7 is a schematic of the resistor network 618 shown in FIG. 6, which includes multiple resistors and is configured to withstand failure of one or more resistors within the network 618 without significantly affecting the overall resistance of the network 618. By utilizing multiple resistors, the resistor network 618 may avoid dramatic increases or decreases in resistance due to resistor failure, thus avoiding dramatic increases or decreases in voltage drops in the circuit. For example, if the resistor network 618 were a single resistor that failed and shorted, the result may be an increased voltage drop across terminals 631 and 632. Such an increase in the voltage drop at the terminals 631 and 632 may exceed IS standards and may risk igniting an explosive atmosphere. Further, by utilizing multiple resistors, each individual resistor receives only a portion of the current that enters the network 618, which may prevent the resistors from overheating and exceeding IS standards.

The resistor network 618 may include a resistor network 702 and a resistor network 704 arranged in parallel, each of which may be switched out of the resistor network 618 via a switch 706 and a switch 708, respectively. In some instances, the entire resistor network 618 may be switched out of the circuit 609 (e.g., during power up or when the tool 600 is communicating with an actuator). The resistor network 618 may have any desirable resistance, e.g., within a range of 100 and 300 ohms (e.g., 167 ohms).

The resistor network 702 may include resistors 712-714, arranged in parallel, and may have a total resistance between 200 and 300 ohms (e.g., 250 ohms). For example, each of the resistors 712-714 may have a resistance of 750 ohms, giving the network 702 a total resistance of 250 ohms. Note, the resistor network 702 may have any other combination of a plurality of resistors (including combinations and/or sub-combinations of resistors arranged in series and/or in parallel) resulting in a total resistance of the network 702 between 200 and 300 ohms. If desired, the resistor network 702 may include a single resistor having a resistance between 200 and 300 ohms.

The resistor network 704 may include a resistor network 721 and a resistor network 723, arranged in series, and may have a total resistance between 400 and 600 ohms (e.g., 500 ohms). The resistor network 721 may include resistors 722 and 724, arranged in parallel, and the resistor network 723 may include resistors 726 and 728, arranged in parallel. Each of the resistors 722-728 may have a resistance of 500 ohms, which may give each of the resistor networks 721 and 723 a resistance of 250 ohms (i.e., 1/X=1/500+1/500). Because the resistor networks 721 and 723 may be arranged in series, the resistor network 704 may have a total resistance of 500 ohms. Note, the resistor network 704 may have any other combination of a plurality of resistors that results in a total resistance between 400 and 600 ohms. For example, the resistor network 704 may include two 1000 ohm resistors arranged in parallel, or may include a single resistor having a resistance of 500 ohms.

Regarding the switches 706 and 708, the control unit 402 may: (i) actuate the switch 706 to switch out the resistor network 702 to increase the resistance of the network 618 (i.e., to the resistance of the network 704), or (ii) actuate the switch 708 to switch out the resistor network 704 to increase the resistance of the network 618 (i.e., to the resistance of the network 702). The control unit 402 may increase the resistance of the network 618 to verify that a field device attached to the terminals 633 and 634 is current-controlled below the rating of the fuse 642, or to bleed off voltage from the active communicator 600 when the power supply 602 is disabled.

In operation, the control unit may switch out one of the networks 702 or 704 depending on which of the terminals 631-634 are connected to a field device and/or based on whether the active communicator 600 is providing power to the field device. For example, in some situations, the active communicator 600 may switch out either the network 702 or 704 to increase the resistance of the network 618 when the active communicator 600 is connected to an externally powered field device.

When one or both of the resistor networks 702 and 704 are switched out of the network 618, the control unit 402 may actuate one or both of the switches 706 and 708 to "activate" both the networks 702 and 704, giving the resistor network 618 a lower resistance than that of either the network 702 or the network 704. The lower resistance may be desirable when operating the active communicator 600 in "tool-power mode" in a hazardous area. IS standards require that the output voltage at the terminals 631 and 632 be lower than what might otherwise be used in normal operation. However, if the voltage at the terminals 631 and 632 is dropped too low, the communication signal transmitted or received via the terminals 631 and 632 may be unreadable. Accordingly, it may be advantageous to lower the resistance of the network 618 from a value that might be used with a traditional communicator (e.g., 250 ohms) to a value that will result in a lower (but still readable) voltage drop over the resistor network 618 (e.g., 167 ohms). In some instances, the resistor network 618 may include additional resistor networks (e.g., 1000 ohms) and/or switches, which may be enable the tool 100 to activate the resistor network when a power supply voltage exceeds 24 V.

One or both of the switches 706 and 708 may be solid state relays, which may offer a number of advantages over typical mechanical relays. For example, solid state relays can be switched by a lower voltage and lower current than most mechanical relays, making it easier to keep the electrical signals generated by the tool 100 at levels compliant with IS standards. Further, unlike typical mechanical relays, solid state relays generally do not generate a spark when operated. Thus, by utilizing solid state relays with the resistor network 618, the tool 100 can avoid violating IS standards that might otherwise be violated with mechanical relays.

One or more resistors in the resistor network 618 may have a large surface area designed to facilitate efficient heat dissipation. For example, one or more resistors in the resistor network 618 may be size 2512 resistors (e.g., 6.3 mm×3.1 mm×0.6 mm). In some cases, one or more resistors in the network 618 may be size 2010 resistors, size 2020 resistors, and/or size 2045 resistors. In some cases, one or more resistors (or sub-networks) within the resistor network 618 may be rated for 2.5 W.

The tool 100 may include a temperature sensor (not shown) to be used in conjunction with the active communicator 600. For example, the temperature sensor may measure a temperature at or near the resistor network 618, which may be utilized by the control unit 402 when calculating a current through the network 618. This temperature measurement is beneficial because current calculations obtained based on measurements from the voltage monitor 616 may be inaccurate when a temperature change increases or decreases the resistance of the network 618 to a value different than that assumed by the control unit 402. In short, the temperature sensor enables the control unit 402 to compensate for changes in resistance of the network 618 attributable to temperature changes.

FIGS. 8A-12 are schematics of the tool 100, when it includes the active communicator 600 shown in FIG. 6, connected to various field devices and I/O devices. FIGS. 8A-12 may not show one or more components of the active communicator 600 or tool 100. For example, components that are "switched out" or not active may not be shown. Some components may be active, but may not be shown.

Figure 8A:
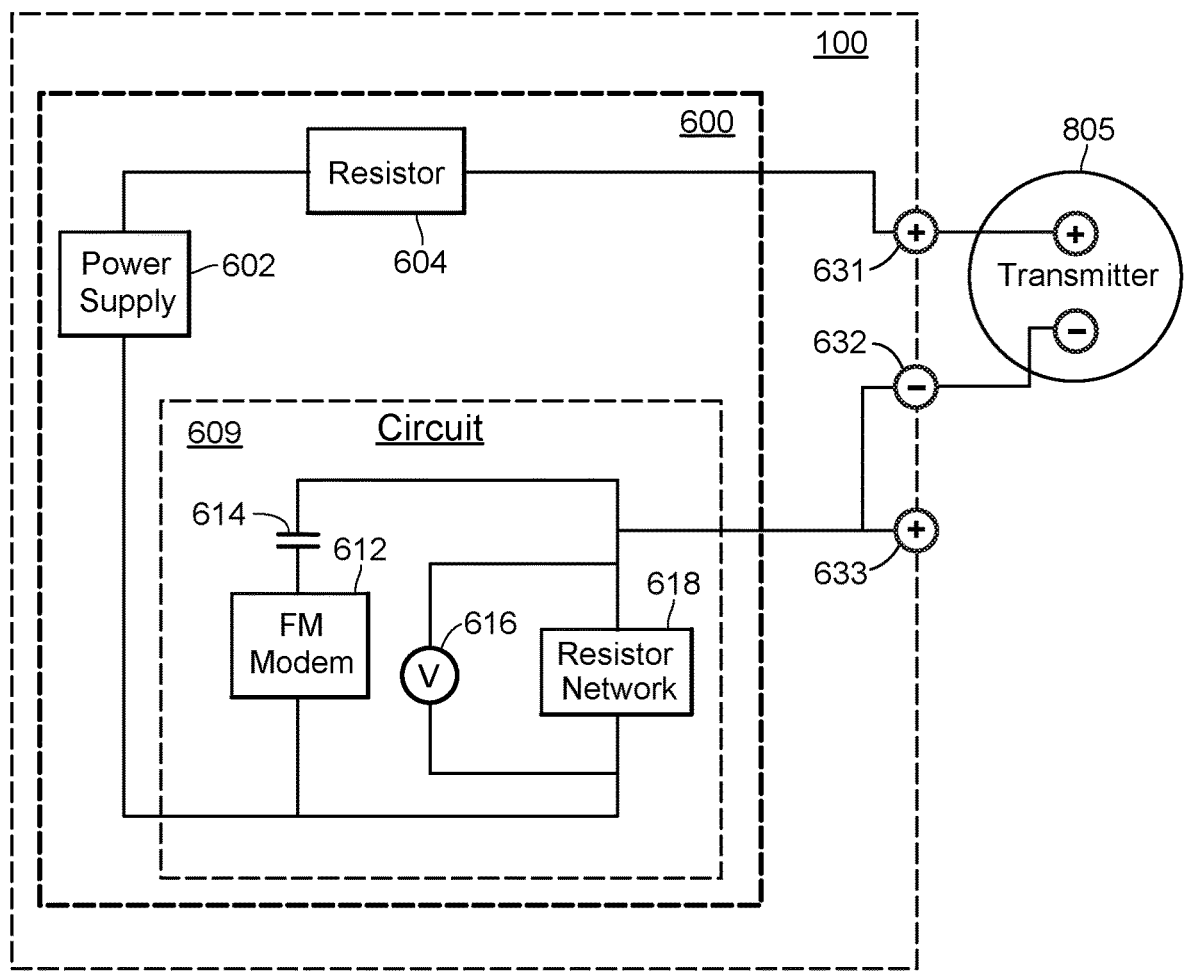
FIG. 8A is a schematic of the portable field maintenance tool shown in FIG. 6 connected to a transmitter, depicting an example in which the transmitter is powered by the active communicator of the portable field maintenance tool.

FIG. 8A illustrates an example in which the active communicator 600 is connected to a transmitter 805 and in which the active communicator 600 provides power to the transmitter 805 (i.e., a tool-power transmitter connection). In such a configuration, a user may connect the active communicator 600 to the transmitter 805 via the terminals 631 and 632. The active communicator 600 may power the transmitter 805 by way of the power supply 602, e.g., transmitting a DC signal of up to 4 mA to the transmitter 805. Further, the active communicator 600 may engage in one-way analog communication and/or two-way digital communication with the transmitter 805. To engage in one-way analog communication, the active communicator 600 may activate a "transmitter connection" mode in which the active communicator 600 expects the transmitter 805 to communicate by modulating the current magnitude (e.g., between 4-20 mA) of the DC signal provided by the power supply 602. The control unit 402 (not shown) may switch the DC current controller 610 (not shown) out of the circuit 609 because the transmitter 805, not the circuit 609, may modulate the DC current flowing between the transmitter 805 and tool 100. Note, the FM modem 612 may remain connected to the circuit 609, and may facilitate two-way digital communication by: (i) transmitting information to the transmitter 805 by modulating the frequency of an AC signal superimposed on the DC signal, and/or (ii) receiving information from the transmitter 805 by demodulating a frequency modulated AC signal superimposed on the DC signal by the transmitter 805. The diagnostics manager 602 may analyze a signal received from the transmitter 805 based on measurements obtained from the voltage monitor 616.

Figure 8B:
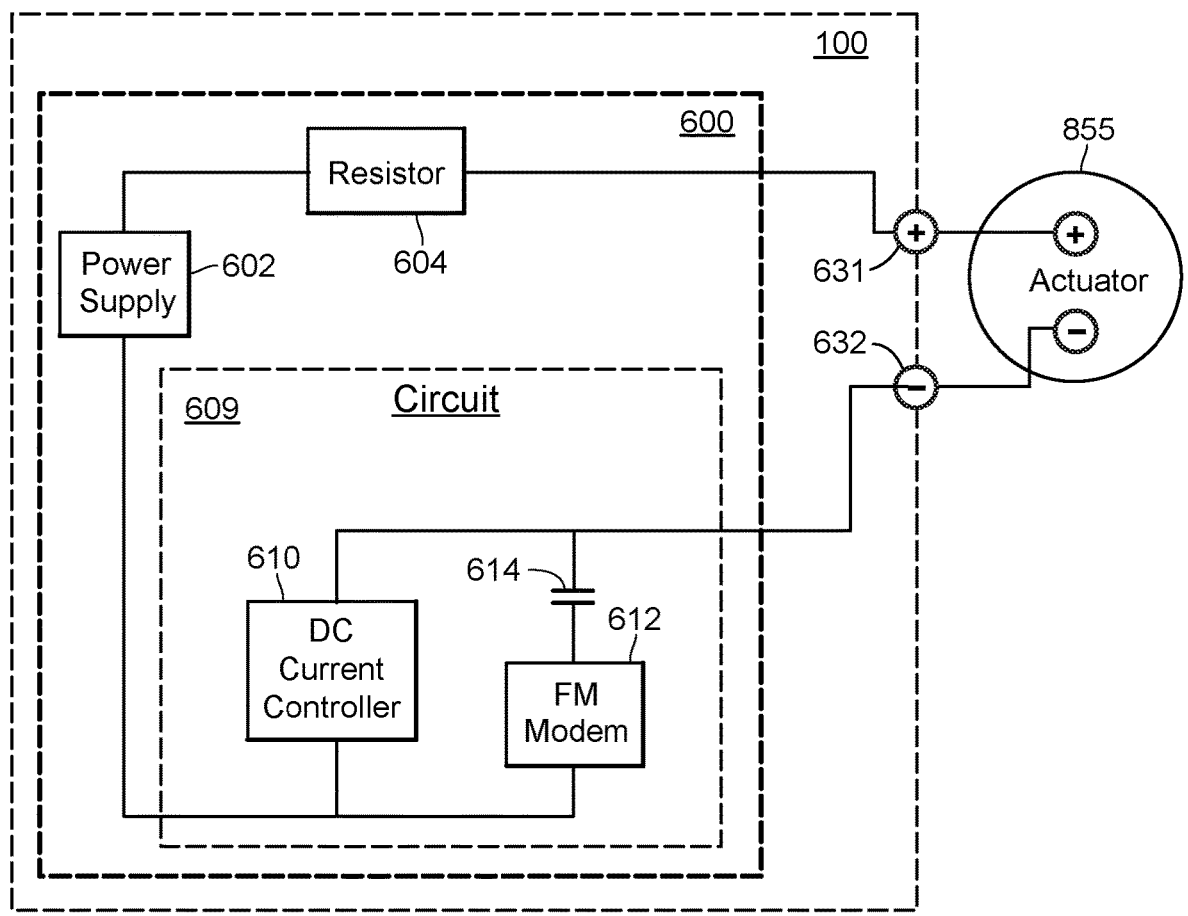
FIG. 8B is a schematic of the portable field maintenance tool shown in FIG. 6 connected to an actuator, depicting an example in which the actuator is powered by the active communicator of the portable field maintenance tool.

FIG. 8B illustrates an example in which the active communicator 600 is connected to an actuator 855 and in which the active communicator 600 provides power to the actuator 855. In such a configuration, a user may connect the active communicator 600 to the actuator 855 via the terminals 631 and 632. The active communicator 600 may power the actuator 855 by way of the power supply 602, e.g., transmitting a DC signal of up to 4 mA to the actuator 855. The active communicator 600 may engage in one-way analog communication and/or two-way digital communication with the actuator 855. To engage in one-way analog communication, the active communicator 600 may activate an "actuator connection" mode in which the active communicator 600 expects the actuator 855 to receive information by interpreting changes in the current magnitude of the DC signal provided by the active communicator 600 (e.g., between 4-20 mA). Because the active communicator 600 may expect the actuator 855 to receive rather than transmit a current modulated DC signal, the control unit 402 may switch the resistor network 618 (not shown) and voltage monitor 616 (not shown) out of the circuit 609 because the network 618 and monitor 616 may not be needed to receive and interpret a current modulated DC signal. Note, the FM modem 612 may remain connected to the circuit 609, and may facilitate two-way digital communication by: (i) transmitting information to the actuator 855 by modulating the frequency of an AC signal superimposed on the DC signal, and/or (ii) receiving information from the actuator 855 by demodulating a frequency modulated AC signal superimposed on the DC signal by the actuator 855.

Figure 9A:
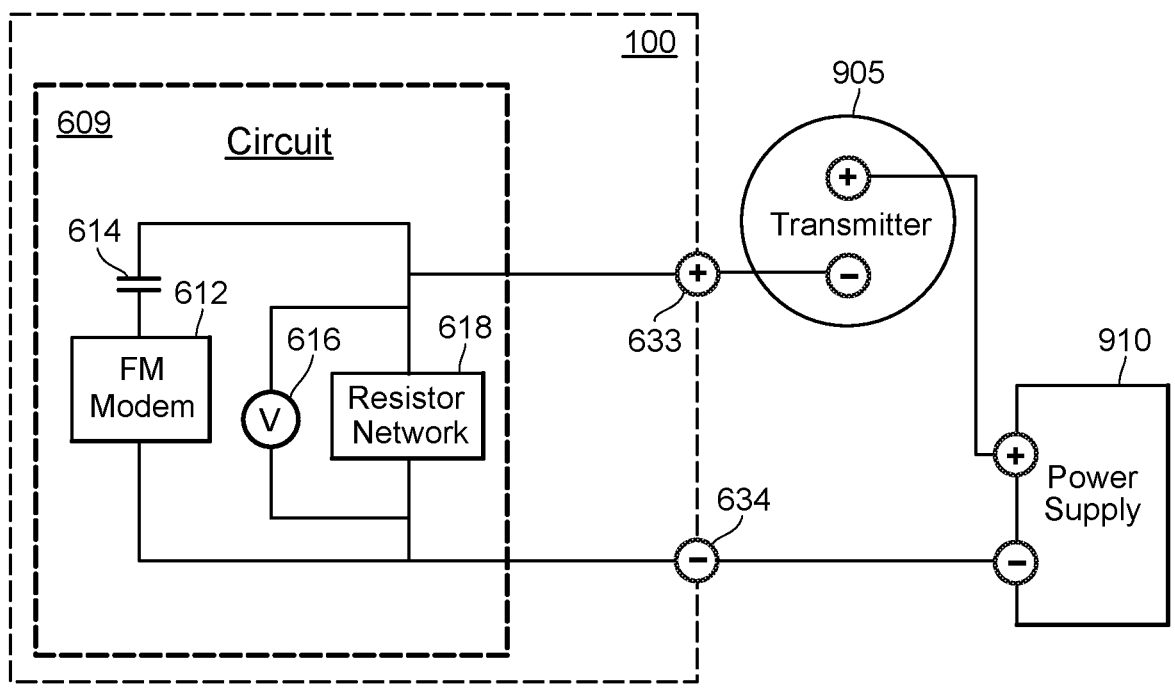
FIG. 9A is a schematic of the portable field maintenance tool shown in FIG. 6 connected to a transmitter, depicting an example in which the transmitter is not powered by the active communicator of the portable field maintenance tool.

FIG. 9A illustrates an example in which the circuit 609 of the active communicator 600 may be connected to a transmitter 905 and in which the transmitter 905 is not powered by the active communicator 600. The transmitter 905 may be powered by a power supply 910, which may be a portable power supply or a rack-mounted power supply. In some instances, the transmitter 905 may rely on both loop power and the power supply 910 for power. A user may connect the circuit 609 to the transmitter 905 via the terminals 633 and 634. Because the terminals 631 and 632 are not connected, a closed circuit including the power supply 602 is not formed. The circuit 609 may engage in one-way analog communication and/or two-way digital communication with the transmitter 905 in a manner similar to that discussed regarding FIG. 8A. The configuration shown in FIG. 9A may be useful when a user encounters a conventional loop that lacks a loop resistor. In some instances, the tool 100 may be connected to a loop that already has a loop resistor (e.g., connected to the negative terminal of the power supply 910). In such cases, the power supply 910 may be wired to the terminals of the transmitter 905 as one would expect in normal operation, and the user may connect the terminals 633 and 634 to the terminals of the transmitter 905. Alternatively, the user may connect the terminals 633 and 634 across the already-existing external loop resistor.

Figure 9B:
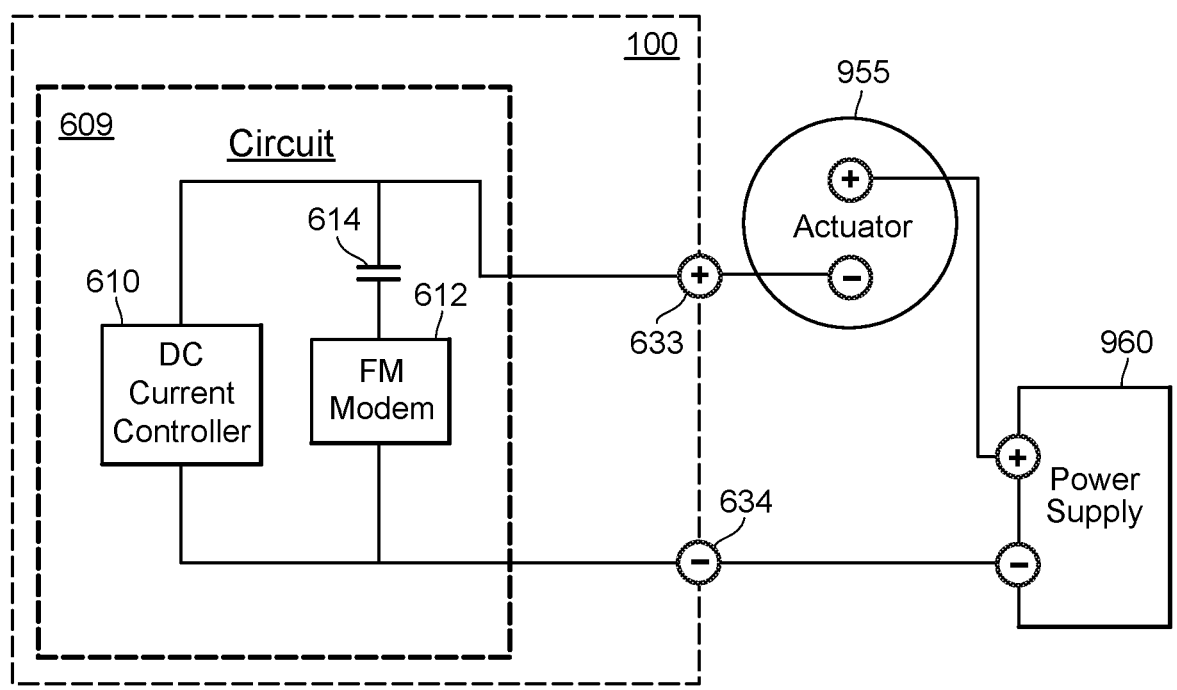
FIG. 9B is a schematic of the portable field maintenance tool shown in FIG. 6 connected to an actuator, depicting an example in which the actuator is not powered by the active communicator of the portable field maintenance tool.

FIG. 9B illustrates an example in which the circuit 609 of the active communicator 600 is connected to an actuator 955 and in which the actuator 955 is not powered by the active communicator 600. The actuator 955 may be powered by a power supply 960, which may be a portable power supply or a rack-mounted power supply. A user may connect the circuit 609 to the transmitter 905 via the terminals 633 and 634. Because the terminals 631 and 632 are not connected, a closed circuit including the power supply 602 is not formed. The circuit 609 may engage in one-way analog communication and/or two-way digital communication with the actuator 955 in a manner similar to that discussed regarding FIG. 8B. In some instances, the power supply 960 may include a DC current controller that transmits a DC signal (e.g., 4-20 mA). In such instances, the terminals of the power supply 960 may be connected to the terminals of the actuator 955 to form a loop. Further, in such instances a user may connect the tool 100 to the terminals of the actuator 955, effectively placing the tool 100 in parallel with the power supply 960. Advantageously, such a connection enables a user to utilize the tool 100 without breaking an already existing loop between the actuator 955 and power supply 960.

Figure 10:
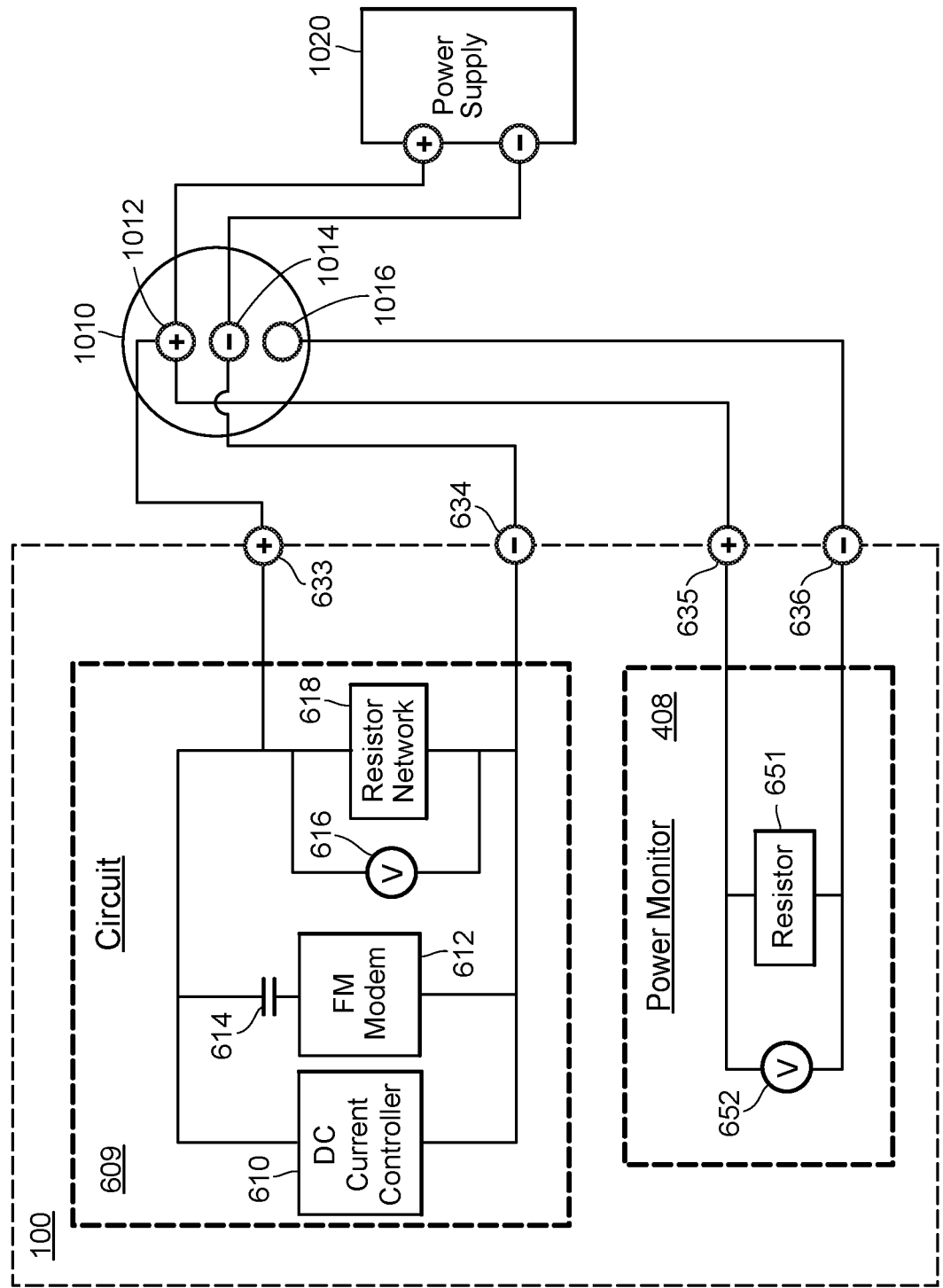
FIG. 10 is a schematic of the portable field maintenance tool shown in FIG. 6 connected to a field device, depicting an example in which a power monitor of the portable field maintenance tool may be connected to the field device in parallel to measure electrical characteristics of signals sent or received by the field device.

FIG. 10 illustrates an example in which the circuit 609 of the tool 100 may be connected to a field device 1010 powered by a power supply 1020, and in which the power monitor 408 of the tool 100 may be connected to the field device 1010 in parallel with the power supply 1020 so that it can measure electrical characteristics of signals sent or received by the field device 1010 without disconnecting the field device 1010 from the power supply 1020. The field device 1010 may be an actuator or a transmitter; may be powered by a power supply 1020; and may include a positive terminal 1012, a negative terminal 1014, and a test terminal 1015. The test terminal 1015 may enable detection of current through the field device 1010 and/or detection of voltage across the terminals 1012 and 1014.

The circuit 609 may be connected to the field device 1010 via the terminals 633 and 634, and via the positive and negative terminals 1012 and 1014 of the field device 1010. The power monitor 408 can be connected to the field device 1010 without breaking the loop between the circuit 609 and the field device 1010, enabling a user to simultaneously communicate with the field device 1010 via the circuit 609 and to verify that current, voltage, and/or power measurements associated with communication signals between the field device 1010 and the circuit 609 are within an expected range. Advantageously, there is no need to disconnect the field device 1010 from the power supply 1020 when utilizing the power monitor 408 to measure the electrical characteristics of the signals received or transmitted by the field device 1010. In some cases, the power supply 1020 may include a DC current controller that send a 4-20 mA signal for controlling the field device 1010 (e.g., when the field device 1010 is an actuator). In such cases, the DC current controller 610 may be switched out of the circuit, and the tool 100 may function primarily as a digital communicator using the FM modem 612.

Figure 11:
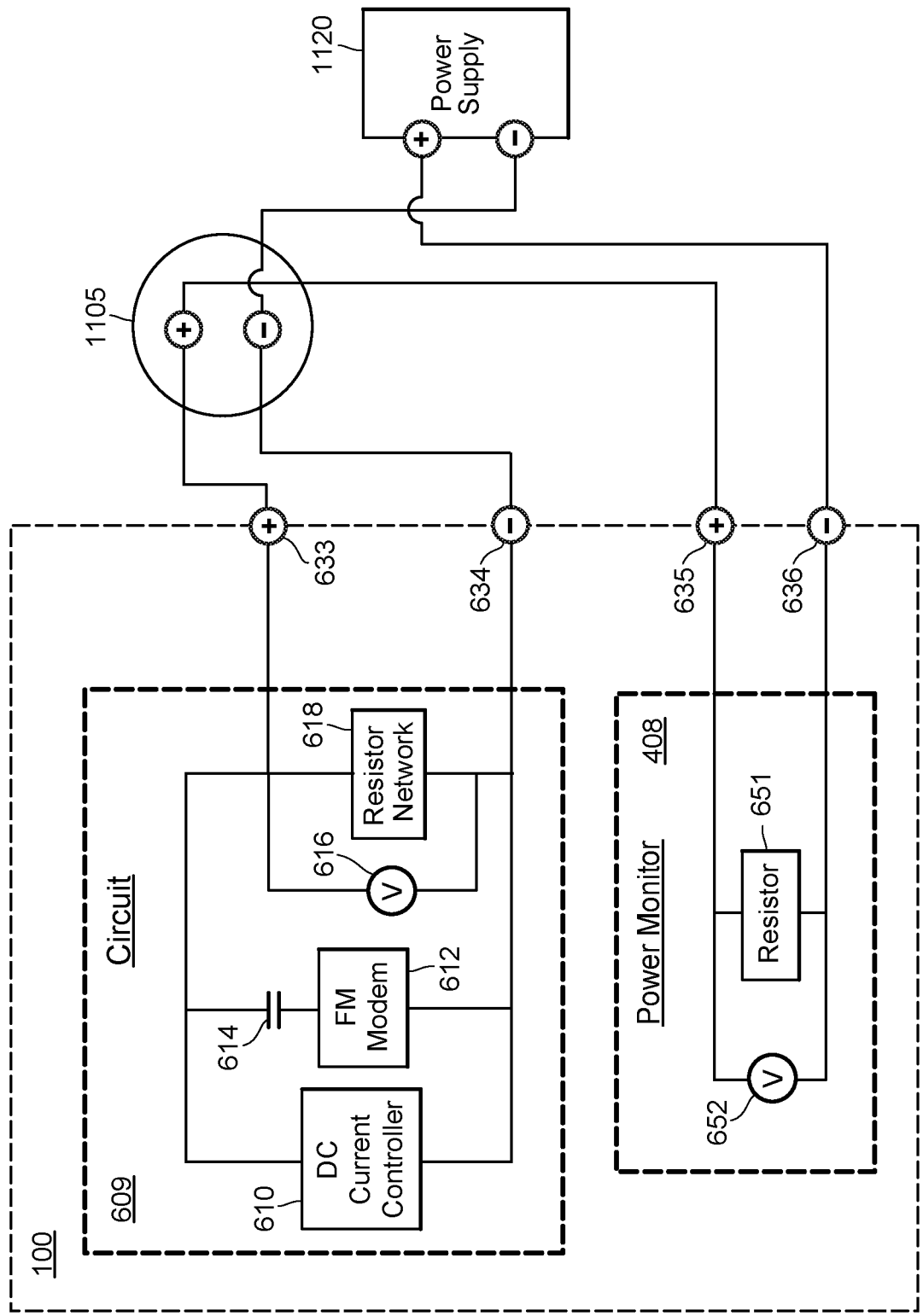
FIG. 11 is a schematic of the portable field maintenance tool shown in FIG. 6 connected to a field device, depicting an example in which the power monitor of the portable field maintenance tool may be connected to the field device in series to measure electrical characteristics of signals sent or received by the field device.

FIG. 11 illustrates an example in which the circuit 609 of the tool 100 may be connected to a field device 1105 powered by a power supply 1120, and in which the power monitor 408 of the tool 100 may be connected to the field device 1105 in series with the power supply 1120 so that it can measure electrical characteristics of signals sent or received by the field device 1010. The power monitor 408 may be connected to the field device 1105 via the terminals 635 and 636. Because the field device 1105 does not include a test terminal like the field device 1010 shown in FIG. 10, the power monitor 408 may be connected to the field device 1105 in series. That is, the positive terminal of the power supply 1120 may be disconnected from the positive terminal of the field device 1105, and a first terminal from the power monitor 408 (e.g., terminal 635 or 636) may be connected to the positive terminal of the field device 1105 and a second terminal from the power monitor 408 (e.g., the terminal 635 or 636) may be connected to the positive terminal of the power supply. In some cases, the power monitor 408 may be connected in series between the negative terminal of the field device 1105 and a loop resistor (not shown) connected to the negative terminal of the power supply 1120. Typically, such a loop resistor can be found when the field device 1105 is a transmitter. In such cases, the resistor network 618 may be switched out of the circuit 609.

Figure 12:
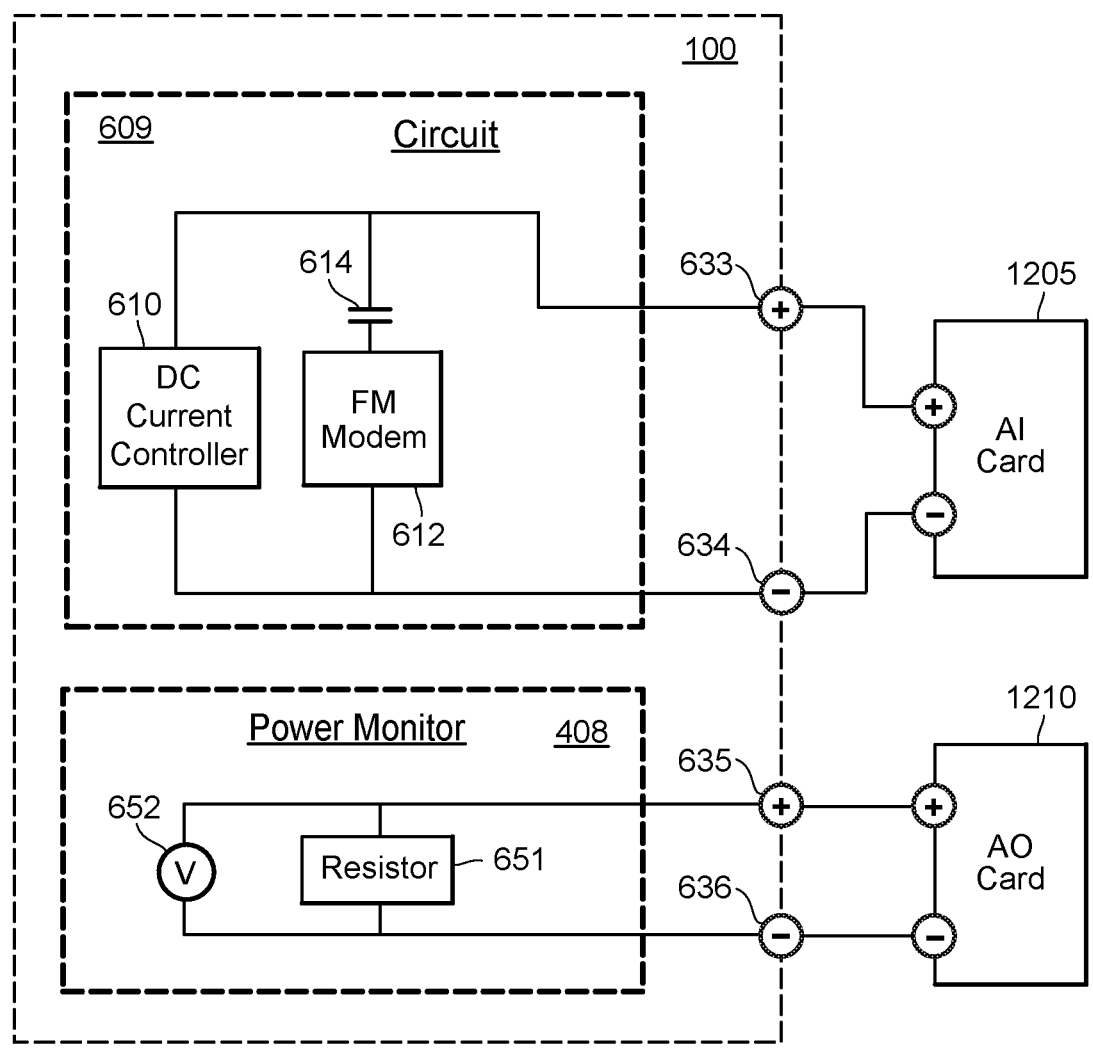
FIG. 12 is a schematic of the portable field maintenance tool shown in FIG. 6 connected to I/O devices, depicting an example in which the portable field maintenance tool may test the I/O devices.

FIG. 12 illustrates an example in which the circuit 609 of the active communicator 600 may be used to test I/O devices. In particular, the circuit 609 may be connected to an AI card 1205 (which may be connected to a transmitter) to verify that a signal transmitted by the DC current controller 610 (intended to simulate a transmitter's signal) is properly received by the AI card 1205. Further, the power monitor 408 may be connected to an AO card 1210 (which may be connected to a controller) to verify communications sent by the controller via the AO card 1210.

Figure 13:
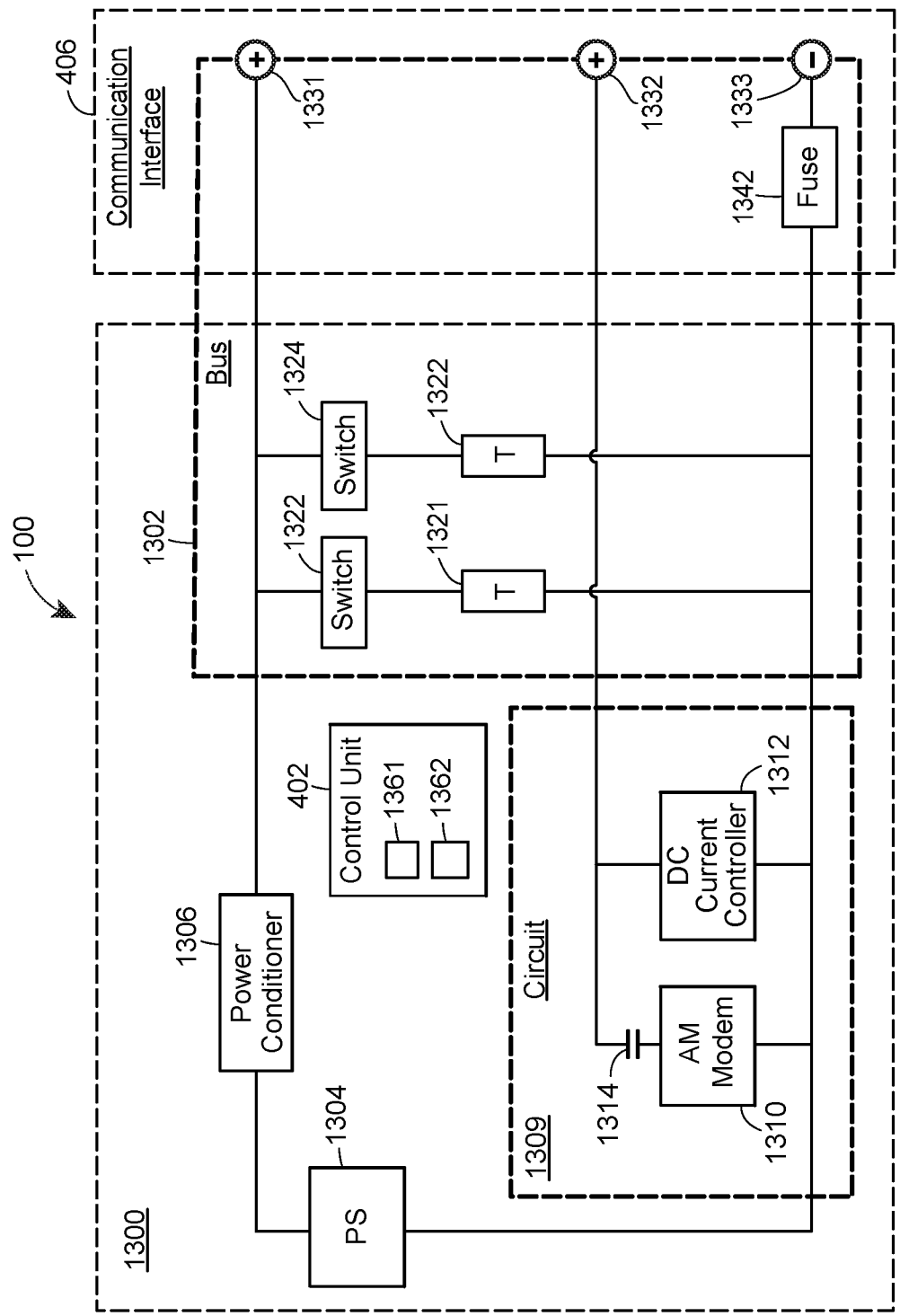
FIG. 13 is a schematic of an active communicator that may be found in an example portable field maintenance tool and that may enable communication via a digital amplitude modulation communication protocol, such as the Fieldbus protocol.

FIG. 13 is a schematic of an active communicator 1300 (which may be an example of the active communicator 404 shown in FIG. 4) for the tool 100 that may be electrically connected to the field device 160 shown in FIG. 1A via the communication interface 406 to: (i) supply power to the field device 160 by way of a DC signal (e.g., 10-25 mA); and (ii) communicate with the field device 160 by way of a digital AC signal superimposed on the DC signal. Advantageously, the active communicator 1300 may be utilized to communicate with and/or diagnose Fieldbus field devices. Further, unlike typical PTDs configured for AM communication, the active communicator 1300 can measure current, as well as DC and AC voltages at the same terminal set that is used for communicating with the field device 160. In some cases, the active communicator 1300 may be energy limited and fault tolerant according to IS standards, and enabling the active communicator 1300 and the tool 100 to power, communicate with, and/or diagnose field devices and communication links located in hazardous areas.

The active communicator 1300 may be communicatively coupled to the control unit 402, and may include: (i) a bus 1302 electrically connected to the communication interface 406, (ii) a power supply 1304 configured to transmit a power signal via the bus 1302, and (iii) a communication circuit 1309 configured to communicate with the field device 160 via the bus 1302. The communication circuit 1309 may be configured to send and receive digital communication signals, which may be amplitude modulated AC signals (e.g., 15-20 mA peak-to-peak).

The bus 1302 may be referred to as an "internal bus" or "mini-bus," and may be disposed at least partially within the housing 128 shown in FIG. 1A. The bus 1302 may enable the tool 100 to connect to, communicate with, and/or power a field device, even when the field device does not have an active and healthy connection to a bus (such as the fieldbus segment 300 shown in FIG. 3) in the plant environment. By contrast, traditional PTDs that can communicate with a bus-based field device typically require that the field device be connected to a functioning external bus located in the process plant. The bus 1302 may include terminators 1321 and 1322 that provide sufficient resistance to enable communication on the bus 1302. Each of the terminators 1321 and 1322 may include a resistor (e.g., having a resistance between 90 ohms and 105 ohms) in series with a capacitor (e.g., having a capacitance of 1 µF). The bus 1302 may include switches 1322 and 1324 for switching the terminators 1321 and 1322 out of the bus 1302, or for switching the bus 1302 completely out of the active communicator 1300 (e.g., when the active communicator 1300 is connected to a field device already connected to a healthy bus). Advantageously, the bus 1302 enables a field device to be tested in isolation, allowing a user to more easily identify the source of communication problems. For example, a user may utilize the active communicator 1300 to measure signals transmitted by an externally powered field device, to remove the field device from the external power source (e.g., from the powered segment), and to take the same measurements on the bus 1302, which can be compared to the previously obtained measurements.

The circuit 1309 may communicate with the field device 160, which may be a Fieldbus device, via the bus 1302, and may include an AM modem 1310 connected in series to a capacitor 1314, the combination of which are electrically connected in parallel to a DC current controller or sink 1312. The AM modem 1310 may transmit to and/or receive information from the field device 160 using a digital amplitude modulation scheme (such as the Fieldbus protocol), and may be the same as or similar to the AM modem 514 shown in FIG. 5. As an example, the AM modem 1310 may modulate and/or demodulate a signal at 15-20 mA (e.g., −10 mA to 10 mA). The capacitor 1314 may filter DC current, allowing only the digital communication signal to pass to the AM modem 514. The DC current controller 1312 may be configured to draw a DC current sufficient to enable the AM modem 1310 to superimpose the communication signal on the DC current without the current dropping below 0 mA. For example, the DC current controller 1312 may draw a DC current of 11 mA, enabling the AM modem 1310 to superimpose a 20 mA signal on the DC current so that the total current on the wires connected to the communication interface 406 varies from 1 mA to 21 mA.

The communication interface 406 may include terminals 1331-1333. The field device 160 may be connected to the terminals 1332 and 1333 to establish a communication link between the field device 160 and the circuit 1309. If a user wishes to supply power to the field device 160 using the tool 100, the user may place a shunt between the terminal 1331 and the terminal 1332. Placing the shunt between the terminals 1331 and 1332 may activate the bus 1302, which may create sufficient load impedance to ensure communication signals transmitted via the terminals 1332 and 1333 are within an expected range such that the AM modem 1310 and/or the field device 160 can interpret the communication signals (e.g., between 0.5 and 1.5 Vpp). The communication interface 406 may include a fuse 1342, electrically connected in series with the terminal 1333, that has a resistance of 11 ohms and that is rated for 50 mA. In some cases, the active communicator 1300 does not include the fuse 1342. In some cases, the fuse 1342 may be placed between the terminal 1333 and ground.

The power supply 1304 may be configured to supply a power signal on the bus 1302 at a voltage between 15 V and 20 V (e.g., 17 V). The power supply 1304 may be a transformer-based power supply, and may "shift" its ground with respect to the terminal 1333. The power supply 1304 may be configured to limit a voltage drop across the terminals 1332 and 1333 to a threshold consistent with IS standards. For example, in some cases the maximum allowable output voltage is limited to 15 V at no load. The output voltage at full load may be 10.5 V. The power supply 1304 may be current limited (e.g., 38 mA) to avoid exceeding voltage and/or power thresholds at the terminals 1331-1333. The active communicator 1300 may include a power conditioner 1306, connected in series to the power supply 1304, configured to prevent the power supply 1304 from filtering out communication signals (e.g., from the AM modem 1310 and/or a connected field device).

In operation, the active communicator 1300 may operate in tool-power mode and external-power mode. In tool-power mode, a user may connect the field device 160 to the terminals 1332 and 133, and may connect a shunt to terminals 1331 and 1332 so that current will flow from the terminal 1331 to the terminal 1332 and to the connected field device 160. In external-power mode, a user may connect the field device 160 to terminals 1332 and 1333, leaving an open circuit between terminals 1331 and 1332.

When in external-power mode, the switches 1332 and 1324 may be activated to switch out the bus 1302 and create an open circuit between the terminals 1321-1322 and the wire connecting the power condition 1306 to the terminal 1331. Further, the DC current controller 1312 may be switched out of the circuit 1309 when the active communicator 1300 is in external-power mode.

The active communicator 1300 may operate in communications mode or diagnostics mode. When in communications mode, the active communicator 1300 may communicate with the connected field device 160. When in diagnostics mode, the active communicator 1300 may measure electrical attributes of signals on a communication bus (e.g., a Fieldbus segment), and/or may measure electrical attributes of signals received at the terminals of the field device 160. When in diagnostics mode, DC current controller 1312 may not draw a significant current. When in communications mode, the DC current controller 1312 may draw a current (e.g., 11 mA). In some cases, the active communicator 1300 may operate in communications mode and diagnostics mode simultaneously.

If desired, the control unit 402 may disable one or more of the power supply 1304, the power condition 1306, the terminators 1321/1322, and/or the circuit 1309 when a change in voltage or current is detected at the terminals 1331-1333. For example, a detected high voltage across the terminals 1332 and 1333 may indicate that a user has attached a new power source, which may cause the active communicator 1300 to disable one or more components. As another example, a detected high current at the terminals 1332 and 1333 may indicate that a user has shorted wires or attempted to add another device, and may cause the active communicator 1300 to disable one or more components. For example, a low voltage measurement may indicate that an externally powered field device has lost power. A low current measurement may indicate a device has been removed from the terminals 1331-1333.

The control unit 402 may include a circuit manager routine 1361 for managing the active communicator 1300 and/or a diagnostics manager routine 1362 for analyzing signals sent and/or received by the active communicator 1300. The circuit manager 1361 may switch out the circuit 1309 to protect a current limited connection from having its current limit exceeded due to the current load of the circuit 1309. Further, a user may interact with the UI 410 to turn off the power supply 1304 at any time.

Further, the circuit manager 1361 may compensate for signal measurement error caused by the fuse 1342. That is, the circuit manager 1361 may account for the resistance of the fuse 1342 (which may be roughly 11 ohms in some cases) as well as the resistance of the terminators 1321 and 1322 when calculating current measurements based on voltage drops on the bus 1302 associated with communication signals.

The diagnostics manager 1362 may: (i) identify field devices, (ii) detect and analyze electrical characteristics of signals sent and/or received by the active communicator 1300, (iii) log measurements and/or analysis performed over time, and/or (iv) perform a noise spectrum analysis.

First, the diagnostics manager 1362 may identify field devices connected to the bus 1302 (or connected to an external bus to which the active communicator 1300 is connected) by tag or device ID. The diagnostics manager 1362 may enable a user to create a user selectable device list that the user can select during creation of a log file to define file name, bus name, and/or location name (e.g., a user customizable string such as "storage tank 157").

Second, the diagnostics manager 1362 may detect and analyze electrical characteristics of signals sent and/or received by the active communicator 1300. These measurements may be displayed to a user via the display 122 shown in FIGS. 1 and 4. Further, the circuit manager 1361 may rely on these measurements to activate or deactivate components of the tool 100 (e.g., to protect the components and/or to ensure compliance with IS standards).

Third, the diagnostics manager 1362 may log the measurements and/or the analysis performed over time. For example, the diagnostics manager may create a health report representing "snapshots" taken over time. As an example, a user may utilize the tool 100 to measure signals associated with a given field device on a fairly regular basis (e.g., every day, once a week, etc.) The diagnostics manager 1362 may log these measurements, enabling plant personnel to identify trends over time associated with the field device. The health report may identify a bus by a tag or ID of the lowest address device on the bus. The health report may include information identifying the user of the tool 100 at the time relevant measurements were taken, the date of the relevant measurements, the bus or segment name where the measurements were taken, and/or the name of the location where the measurements were taken. The tool 100 may retrieve some of this information from the field device (e.g., the tag or segment name).

As another example of time-based signal analysis and logging, the diagnostics manager 1362 may create a troubleshooting log for continuously monitoring a field device's signals over a given time period. For example, a plant may be experiencing issues with a particular field device (e.g., communication disruptions), but may be unable to determine the cause of the issues. A user may connect the tool 100 to the field device and leave the tool 100 for an extended period of time (e.g., for a number of hours or days). The tool 100 may then measure and log electrical characteristics of transmitter and/or received signals on a regular interval and/or based on a trigger (e.g., signals dropping above or below a threshold). A user can later analyze the log to identify when the field device is suffering problems, and to determine what might correlate with the field device suffering problems. For example, by comparing the log to historian data collected by the process control system, the user may determine that disruptions experienced by the field device are associated with a start-up of a nearby motor, which is causing vibrations that disrupt the field device's communications. The troubleshooting log may include the same type of information as that included in the health report (e.g., a tag, time, date, etc.).

Fourth, the diagnostics manager 1362 may perform a noise spectrum analysis. In particular, the diagnostics manager 1362 may detect voltages at a small frequency range (e.g., less than 1 kHz) associated with noise and may display the detected voltages so that a user can identify one or more of: (i) a frequency of the noise; (ii) an amplitude of the noise (e.g., average or maximum); and/or (iii) a time at which a noise burst occurs.

Figure 14A:
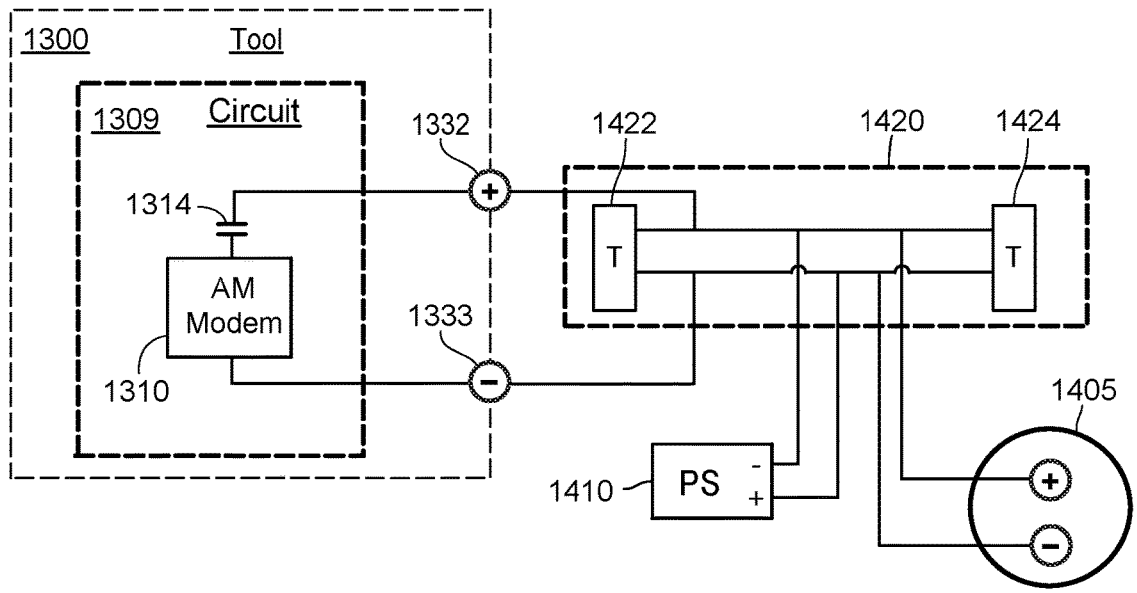
FIG. 14A is a schematic of the portable field maintenance tool shown in FIG. 13, demonstrating an example in which the portable field maintenance tool may be connected to a field device connected to an operational bus.

FIG. 14A is a schematic of the active communicator 1300 connected to a field device 1405 via an external bus 1420 (i.e., external to the active communicator 1300), demonstrating an example in which the active communicator 1300 is connected to a field device connected to an operational bus.

An external power supply 1410 (e.g., a rack-mounted power supply) may supply power to the external bus 1420, and the field device 1405 may draw power from the external bus 1420. The field device 1405 may draw a current of 10-25 mA for power. For example, the field device 1405 may draw a current of 20 mA, which may be supplied by the power supply 1410. In some cases, multiple field devices may be connected to the bus 1420 and may draw power. For example, three field devices may draw 20 mA each from the bus 1420. In such an example, the power supply 1410 may supply 60 mA of current to the bus 1420 for power. A power conditioner (not shown) may be placed between the power supply 1410 and the bus 1420.

The field device 1405 may be connected to the Fieldbus segment 1420 via a Fieldbus spur. The spur may be a two-wire link that connects to the segment 1420 via a junction box, which may connect multiple other spurs to the segment 1420. Due to the multiple links and connection points associated with the Fieldbus segment 1420, it can be difficult to isolate a point of failure. Advantageously, the communicator 1300 can not only communicate with the field device 1405, but can connect to the segment 1420 in place of the field device to "see" what the field device 1405 is "seeing." In short, the tool 100 is a "known good device." If a communication problem exists between a field device and a controller, the tool 100 can connect to and test the field device. If the field device functions properly when connected to the tool 100, a user of the tool 100 knows the problem exists "upstream" of the field device (e.g., at a spur, junction box, I/O cards, or some other cable or device). Accordingly, the user can keep moving upstream and testing communications to isolate the "bad" device or communication link.

The power supply 1410 may supply power to the field device 1405 via the segment 1420, as well as to potentially other field devices connected to the segment 1420.

The segment 1420 may carry a 10-25 mA DC power signal for powering the field device 1405 and an AC digital communication signal utilized by the field device 1405. Generally speaking, multiple other field devices may connect to the segment 1420, each drawing a 10-25 mA DC signal for power. Accordingly, the DC current supplied to the segment 1405 by the power supply 1410 may vary depending on the number of field devices that connect to the segment 1420 and draw power. The segment 1420 may include terminators 1422 and 1424. Each of the terminators 1422 and 1424 may include, e.g., a 100 ohm resistor in series with a 1 µF capacitor. Accordingly, the terminators 1422 and 1422 may block DC current and act as a current shunt for the AC communication signal.

In operation, the active communicator 1300 and field device 1405 may communicate by way of a digital signal (e.g., 20 mA peak-to-peak) superimposed on the power signal on the bus 1420. Generally, only one device connected to the bus 1420 may communicate at any given time. For example, if the active communicator 1300, field device 1405, and two other field devices (not shown) share the bus 1420, only one of the four connected devices may communicate at a given time. Communication on the bus 1420 may be coordinated by a device designated as a Link Active Scheduler (LAS). The LAS may be responsible for passing a token between devices connected to the bus 1420, where only the device with the token may communicate over the bus 1420. In some cases, the field device 1405 may be the LAS; in other cases, the tool 100 may be the LAS.

The LAS maintains a list of all devices needing to access the bus 1420. This list may be called a "Live Device List." In some circumstances, the bus 1420 may have only a single LAS. Devices capable of becoming a LAS may be called link master devices. All other devices may be referred to as "basic devices." If desired, the tool 100 may be a link master device. When the active communicator 1300 is connected to the bus 1420, the tool 100 may bid to become the LAS. The link master that wins the bid (e.g., the one with the lowest address) may begin operating as the LAS immediately upon completion of the bidding process.

Figure 14B:
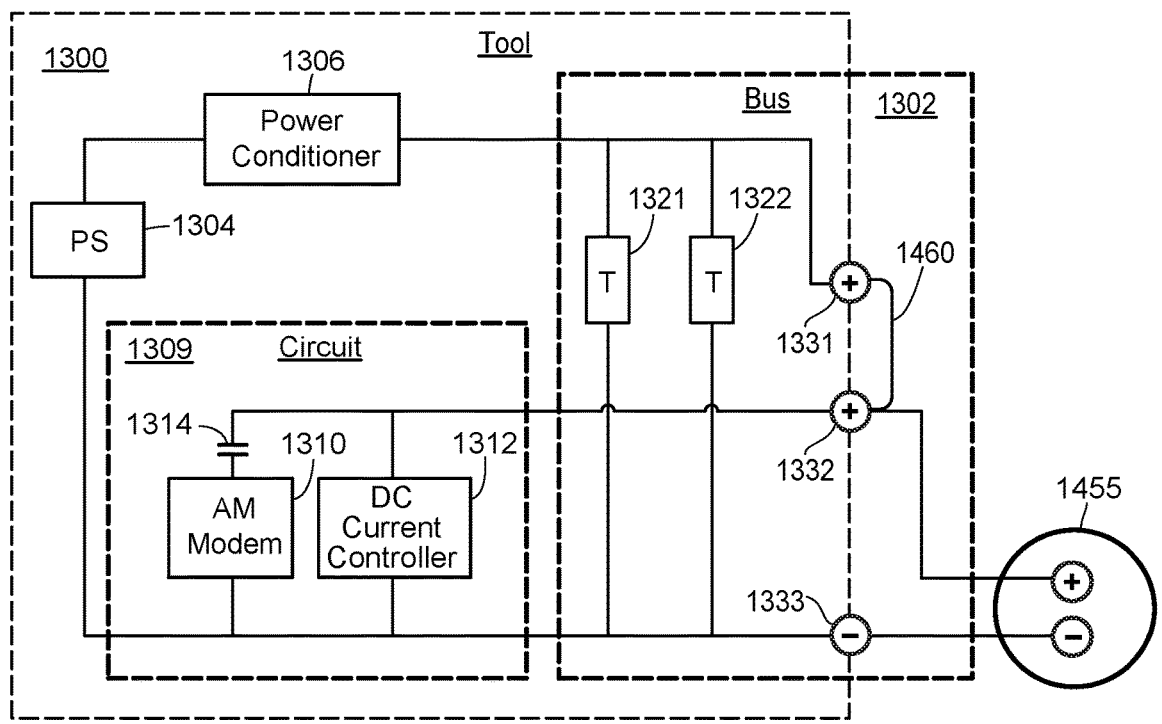
FIG. 14B is a schematic of the portable field maintenance tool shown in FIG. 13, demonstrating an example in which the portable field maintenance tool may power and communicate with a field device via an internal bus of the portable field maintenance tool.

FIG. 14B is a schematic of the active communicator 1300 connected to a field device 1455 via the bus 1302, demonstrating an example in which the active communicator 1300 provides power to the field device 1455. A user may place a shunt 1460 between terminals 1331 and 1332, enabling the power supply 1304 to supply power to the bus 1302. The power supply 1302 may be current limited so that current flowing via the shunt 1460 remains under a maximum threshold consistent with IS standards. For example, the threshold may be between 35-45 mA. As noted, the DC current controller 1312 may draw 11 mA. Further, typical field devices may draw 10-25 mA. The power supply 1302 may be configured to supply up to 36 mA to ensure that the DC current controller 1312 and the field device 1455 receive sufficient current (i.e., based on an expected potential total current draw of 11 mA+25 mA) while remaining IS compliant. The power supply 1304 may be configured to supply a maximum current of 38 mA. A user may utilize the active communicator 1300 to supply power to the field device 1455, to communicate with the field device 1455, and/or to perform diagnostics on the field device 1455 while complying with IS standards.

Figure 15:
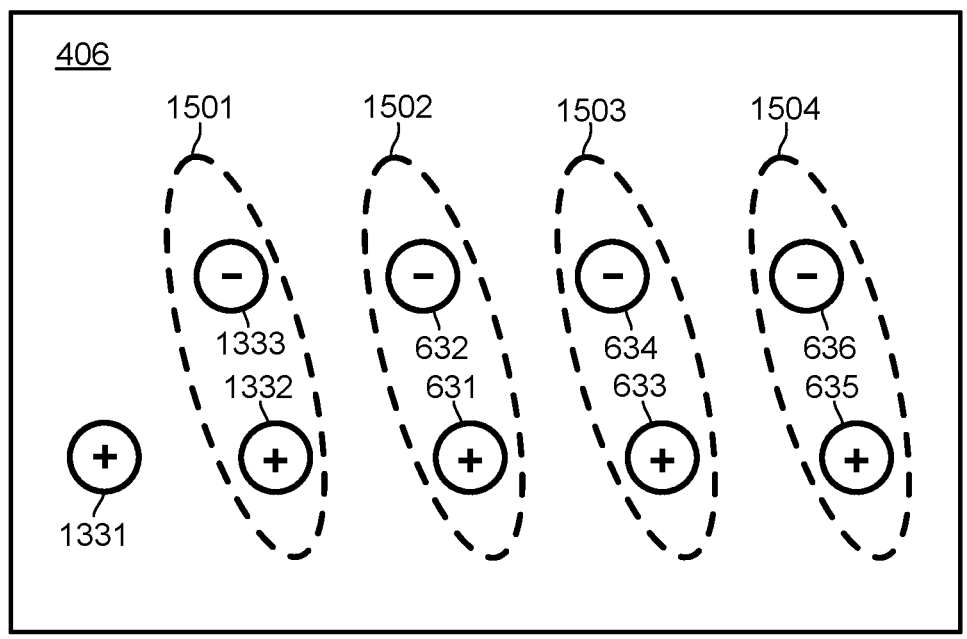
FIG. 15 is a view of a communication interface of the portable field maintenance tool shown in FIG. 1A from a perspective external to the portable field maintenance tool.

FIG. 15 is a view of the communication interface 406 of the tool 100 from a perspective external to the tool 100. As shown, the tool 100 includes the active communicator 600 and the active communicator 1300, shown in FIGS. 6 and 13, respectively. In some cases, the tool 100 includes only one of the active communicator 600 and the active communicator 1300.

The communication interface 406 may include the terminals 1331-1333 shown in FIG. 13 and the terminals 631-636 shown in FIG. 6, which may be arranged as terminal sets 1501-1504.

In operation, a user may connect the terminal set 1501 to a field device configured to communicate according to an AM communication scheme, such as the Fieldbus protocol. The user may utilize the terminal set 1501 when connecting the tool 100 to a field device relying on an external power supply (i.e., external relative to the tool 100), such as a rack-mounted power supply typically found in plant environments. If the user wishes to utilize the tool 100 to power the field device, the user may connect terminals 1331 and 1332 using a shunt.

As another example, a user may connect the terminal set 1502 to a field device that requires power and that is configured to communicate according to a DC current signaling scheme (e.g., 4-20 mA) and/or according to a digital FM communication scheme (e.g., the HART protocol) and that requires power. Alternatively, if the user wants to connect the tool 100 to a similarly configured field device that is already powered by an external power supply, the user may connect the field device to the terminal set 1503. A user may also connect the terminal set 1502 to a field device, or to a communication link connected to the field device, to detect the electrical characteristics (e.g., current, voltage) of signals transmitted by the field device or received by the field device.

Finally, a user may connect the terminal set 1504 to a field device to detect the electrical characteristics (e.g., current, voltage) of signals transmitted by the field device or received by the field device. The user may also connect the terminal set 1504 to a communication link (e.g., a HART loop or Fieldbus segment) to detect the electrical characteristics of signals transmitted via the communication link. In some cases, the power monitor 408 connected to the terminal set 1504 does nothing but measure current.

As shown, the communication interface 406 enables the tool 100 to communicate with or diagnose field devices configured according to different protocols. Thus, a user may carry the tool 100 to service multiple different types of field devices rather than carrying multiple specialized tools.

What is claimed is:

1. A portable field maintenance tool comprising:
   (A) a housing;
   (B) a communication interface disposed through the housing, the communication interface including an internal portion accessible within the housing;
   (C) one or more communication circuits disposed within the housing and electrically connected to the internal portion of the communication interface, the one or more communication circuits configured to communicate according to a first protocol and to communicate according to a second protocol; and (D) one or more power supplies disposed within the housing and electrically connected to the internal portion of the communication interface, the one or more power supplies configured to supply power according to the first protocol and to supply power according to the second protocol; and wherein the communication interface further includes one or more terminals that are:

(i) connectable to a first field device so that the first field device receives a first composite signal including a first power signal and a first communication signal, wherein the first composite signal is configured, according to the first protocol, to supply power via the first power signal from the one or more power supplies to the first field device and to communicatively connect the first field device to the one or more communication circuits; and (ii) connectable to a second field device so that the second field device receives a second composite signal including a second power signal and a second communication signal, wherein the second composite signal is configured, according to the second protocol, to supply power via the second power signal from the one or more power supplies to the second field device and to communicatively connect the second field device to the one or more communication circuits;

wherein the first power signal conforms to a first set of requirements associated with the first protocol and the second power signal conforms to a second set of requirements, different from the first set of requirements, associated with the second protocol;

wherein the first field device is configured to be powered by power signals conforming to the first set of requirements associated with the first protocol; and wherein the second field device is configured to be powered by power signals conforming to the second set of requirements associated with the second protocol.

2. The portable field maintenance tool of claim 1, wherein the one or more communication circuits are configured to communicate according to the first protocol by way of a digital amplitude modulation (AM) communication signal.

3. The portable field maintenance tool of claim 1, wherein the one or more communication circuits are configured to communicate according to the second protocol by way of a digital frequency modulation (FM) communication signal.

4. The portable field maintenance tool of claim 1, wherein the first protocol is a HART protocol and the second protocol is a Fieldbus protocol.

5. The portable field maintenance tool of claim 1, wherein the one or more communication circuits include:
a first communication circuit configured to communicate according to the first protocol; and
a second communication circuit configured to communicate according to the second protocol.

6. The portable field maintenance tool of claim 5, wherein the one or more power supplies include:
a first power supply configured to supply power according to the first protocol; and
a second power supply configured to supply power according to the second protocol.

7. The portable field maintenance tool of claim 6, wherein the one or more terminals include:
a first pair of terminals electrically connected to the first communication circuit and to the first power supply, wherein the first composite signal is transmitted via the first pair of terminals to the first field device; and
a second pair of terminals that is electrically connected to the second communication circuit and to the second power supply, wherein the second composite signal is transmitted via the second pair of terminals to the second field device.

8. The portable field maintenance tool of claim 7, further comprising:
one or more energy measurement circuits electrically connected to the first pair of terminals and to the second pair of terminals, the one or more energy measurement circuits configured to measure at the first pair of terminals one or more electrical characteristics of the first composite signal and to measure at the second pair of terminals one or more electrical characteristics of the second composite signal.

9. The portable field maintenance tool of claim 1, wherein the one or more power supplies and the one or more communication circuits are configured to avoid exceeding intrinsic safety energy levels.

10. The portable field maintenance tool of claim 1, wherein the first composite signal includes an analog DC communication signal and a digital FM communication signal superimposed on the analog DC communication signal.

11. A method for communicating with a field device, the method including:
communicatively connecting a portable field maintenance tool to a first field device configured according to a first protocol;
transmitting by the portable field maintenance tool a first composite signal configured according to the first protocol, the first composite signal including: (i) a first power signal, conforming to a first set of requirements associated with the first protocol, to power the first field device, and (ii) a first communication signal to communicate with the first field device;
communicatively connecting a portable field maintenance tool to a second field device configured according to a second protocol; and
transmitting by the portable field maintenance tool a second composite signal configured according to the second protocol, the second composite signal including: (i) a second power signal, conforming to a second set of requirements, distinct from the first set of requirements, associated with the second protocol, to power the second field device, and (ii) a second communication signal to communicate with the second field device;
wherein, to be powered, the first field device requires a power signal conforming to the first set of requirements of the first protocol; and
wherein, to be powered, the second field device requires a power signal conforming to the second set of requirements of the second protocol.

12. The method of claim 11, wherein transmitting the first composite signal configured according to the first protocol comprises:
transmitting the first composite signal according to a digital amplitude modulation (AM) protocol.

13. The method of claim 11, wherein transmitting the second composite signal configured according to the second protocol comprises:
    transmitting the second composite signal according to a digital frequency modulation (FM) protocol.

14. The method of claim 11, wherein transmitting the first composite signal configured according to the first protocol comprises:
    transmitting the first composite signal according to a HART protocol.

15. The method of claim 11, wherein transmitting the second composite signal configured according to the first protocol comprises:
    transmitting the second composite signal according to a Fieldbus protocol.

16. The method of claim 11, wherein transmitting the first composite signal includes ramping the first power signal over a time period.

17. The method of claim 11, wherein:
    communicatively connecting the portable field maintenance tool to the first field device comprises communicatively connecting a first pair of terminals of the portable field maintenance tool to the first field device, wherein transmitting the first composite signal comprises transmitting the first composite signal via the first pair of terminals; and
    communicatively connecting the portable field maintenance tool to the second field device comprises communicatively connecting a second pair of terminals of the portable field maintenance tool to the second field device, wherein transmitting the second composite signal comprises transmitting the second composite signal via the second pair of terminals.

18. The method of claim 17, further comprising measuring at the first pair of terminals one or more electrical characteristics of the first composite signal and measuring at the second pair of terminals one or more electrical characteristics of the second composite signal.

19. The method of claim 17, further including placing a shunt between a power terminal and a one of the second pair of terminals so that the second power signal can be transmitted to the second field device.

20. The method of claim 11, further including deactivating one or more power supplies when either the first composite signal or the second composite signal exceeds an electrical threshold.

21. The method of claim 20, wherein the electrical threshold relates to intrinsic safety energy levels.

22. The method of claim 21, wherein the electrical threshold is a current threshold having a value in a range of 45 mA to 55 mA.

23. The method of claim 21, wherein the electrical threshold is a voltage threshold having a value in a range of 25 V to 35 V.

24. The method of claim 21, wherein the electrical threshold is a power threshold having a value in a range of 1 W to 1.5 W.

25. The method of claim 11, wherein the first composite signal includes an analog DC communication signal and a digital FM communication signal superimposed on the analog DC communication signal.

26. A portable field maintenance tool comprising:
    (A) a housing;
    (B) a communication interface disposed through the housing, the communication interface including an internal portion accessible within the housing;
    (C) one or more communication circuits disposed within the housing and electrically connected to the internal portion of the communication interface, the one or more communication circuits configured to communicate according to a first protocol and to communicate according to a second protocol; and
    (D) one or more power supplies disposed within the housing and electrically connected to the internal portion of the communication interface, the one or more power supplies configured to supply power according to the first protocol and to supply power according to the second protocol; and
    wherein the communication interface further includes one or more terminals that are:
        (i) connectable to a first field device so that the first field device receives a first composite signal including an analog DC communication signal and a digital FM communication signal superimposed on the analog DC communication signal, wherein the first composite signal is configured, according to the first protocol, to supply power from the one or more power supplies to the first field device and to communicatively connect the first field device to the one or more communication circuits; and
        (ii) connectable to a second field device so that the second field device receives a second composite signal configured, according to the second protocol, to supply power from the one or more power supplies to the second field device and to communicatively connect the second field device to the one or more communication circuits.

27. A method for communicating with a field device, the method including:
    communicatively connecting a portable field maintenance tool to a first field device configured according to a first protocol;
    transmitting by the portable field maintenance tool a first composite signal configured according to the first protocol, the first composite signal including: (i) a first power signal to power the first field device, and (ii) a first communication signal to communicate with the first field device; wherein transmitting the first composite signal includes ramping the first power signal over a time period;
    communicatively connecting a portable field maintenance tool to a second field device configured according to a second protocol; and
    transmitting by the portable field maintenance tool a second composite signal configured according to the second protocol, the second composite signal including: (i) a second power signal to power the second field device, and (ii) a second communication signal to communicate with the second field device.

28. A portable field maintenance tool comprising:
    (A) a housing;
    (B) a communication interface disposed through the housing, the communication interface including an internal portion accessible within the housing;
    (C) one or more communication circuits disposed within the housing and electrically connected to the internal portion of the communication interface, the one or more communication circuits configured to communicate according to a first protocol and to communicate according to a second protocol; and
    (D) one or more power supplies disposed within the housing and electrically connected to the internal portion of the communication interface, the one or more power supplies configured to supply power according to the first protocol and to supply power according to the second protocol; and wherein the communication interface further includes one or more terminals that are:
(i) connectable to a first field device so that the first field device receives a first composite signal including an analog DC communication signal and a digital FM communication signal superimposed on the analog DC communication signal, wherein the first composite signal is configured, according to the first protocol, to supply power from the one or more power supplies to the first field device and to communicatively connect the first field device to the one or more communication circuits; and
(ii) connectable to a second field device so that the second field device receives a second composite signal configured, according to the second protocol, to supply power from the one or more power supplies to the second field device and to communicatively connect the second field device to the one or more communication circuits;

wherein the portable field maintenance tool further comprises: (E) a control unit configured to disable one or more components of the one or more communication circuits or of the one or more power supplies when an electrical measurement of a one of the one or more components or a one of the first and second composite signal exceeds a threshold.

29. A system comprising:
(A) a plurality of field devices in a process control environment, the plurality of field devices including:
(i) a first field device configured to communicate via a first composite signal, configured according to a first protocol, including a first communication signal and a first power signal for powering the first field device, wherein the first power signal conforms to a first set of power requirements of the first protocol; and
(ii) a second field device configured to communicate via a second compose signal, configured according to a second protocol, including a second communication signal and a second power signal for powering the second field device, wherein the second power signal conforms to a second set of power requirements of the second protocol;

wherein first and second sets of power requirements differ such that a power signal conforming to the first set of requirements does not conform to the second set of requirements and a power signal conforming to the second set of requirements does not conform to the first set of requirements;

wherein the first field device is configured to be powered by power conforming to the first set of requirements and wherein the second field device is configured to be powered by power conforming to the second set of requirements;

(B) a portable field maintenance tool configured for both the first and second protocols such that the portable field maintenance tool is configured to: (i) communicate with both the first and second field devices via the first and second composite signals, and (ii) power both the first and second field devices by supplying the first and second power signals of the first and second composite signals from one or more power supplies internal to the portable field maintenance tool.

30. The system of claim 29, wherein (i) the first set of requirements for the first protocol require a current of the first power signal be within a first range of approximately 1 mA to 4 mA and (ii) the second set of requirements for the second protocol require a current of the second power signal be within a second range of approximately 10 to 25 mA.

* * * * *